United States Patent
Farrugia et al.

(10) Patent No.: US 10,868,672 B1
(45) Date of Patent: Dec. 15, 2020

(54) ESTABLISHING AND VERIFYING IDENTITY USING BIOMETRICS WHILE PROTECTING USER PRIVACY

(71) Applicant: Apple Inc., Cupertino, CA (US)

(72) Inventors: Augustin J. Farrugia, Los Altos, CA (US); Ritwik K. Kumar, San Jose, CA (US); Gianpaolo Fasoli, Redwood City, CA (US); Mathieu Ciet, Paris (FR); Bruno Kindarji, Paris (FR); Eric D. Friedman, Berkeley, CA (US); Gianluca Barbieri, San Jose, CA (US); Lucas O. Winstrom, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/575,314

(22) Filed: Sep. 18, 2019

Related U.S. Application Data

(63) Continuation-in-part of application No. 16/211,155, filed on Dec. 5, 2018, which is a continuation-in-part
(Continued)

(51) Int. Cl.
*H04L 29/06* (2006.01)
*H04L 9/32* (2006.01)
(Continued)

(52) U.S. Cl.
CPC ........ *H04L 9/3221* (2013.01); *G06K 9/00268* (2013.01); *G06K 9/00744* (2013.01);
(Continued)

(58) Field of Classification Search
CPC .. H04L 63/0861; H04L 9/0869; H04L 9/3207
(Continued)

(56) References Cited

U.S. PATENT DOCUMENTS

| 4,993,068 A | 2/1991 | Piosenka et al. |
| 5,053,608 A | 10/1991 | Senanayake |

(Continued)

FOREIGN PATENT DOCUMENTS

| JP | 2000163031 | 6/2000 |
| JP | 2002073566 | 3/2002 |

(Continued)

OTHER PUBLICATIONS

U.S. Appl. No. 15/171,951, "Non-Final Office Action", dated Feb. 9, 2018, 18 pages.

(Continued)

*Primary Examiner* — Longbit Chai
(74) *Attorney, Agent, or Firm* — Kilpatrick Townsend & Stockton LLP

(57) ABSTRACT

A user device can verify a user's identity to a server while protecting user privacy by not sharing any personal data with any other device. To ensure user privacy and to allow multiple independent enrollments, the user device performs an enrollment process in which the user device locally collects and uses biometric data together with a random salt to generate a set of public/private key pairs from which biometric information cannot be extracted. The public keys and the salt, but not the biometric data, are sent to a server to store. To verify user identity, a user device can repeat the collection of biometric data from the user and the generation of public/private key pairs using the salt obtained from the server. If the device can prove to the server its possession of at least a minimum number of correct private keys, the user's identity can be verified.

20 Claims, 12 Drawing Sheets

Related U.S. Application Data of application No. 15/174,251, filed on Jun. 6, 2016, now abandoned.

(60) Provisional application No. 62/172,006, filed on Jun. 5, 2015.

(51) Int. Cl.
*H04L 9/30* (2006.01)
*H04L 9/08* (2006.01)
*G06K 9/00* (2006.01)

(52) U.S. Cl.
CPC .......... *H04L 9/0869* (2013.01); *H04L 9/3073* (2013.01); *H04L 9/321* (2013.01); *H04L 9/3231* (2013.01); *H04L 9/3263* (2013.01)

(58) Field of Classification Search
USPC ........................................................ 713/168
See application file for complete search history.

(56) References Cited

U.S. PATENT DOCUMENTS

| | | | |
|---|---|---|---|
| 5,131,038 A | 7/1992 | Puhl et al. | |
| 5,214,702 A * | 5/1993 | Fischer | G06F 21/00 380/30 |
| 5,280,527 A | 1/1994 | Gullman et al. | |
| 5,469,506 A | 11/1995 | Berson et al. | |
| 5,473,692 A | 12/1995 | Davis | |
| 5,481,265 A | 1/1996 | Russell | |
| 5,483,261 A | 1/1996 | Yasutake | |
| 5,488,204 A | 1/1996 | Mead et al. | |
| 5,526,428 A | 6/1996 | Arnold | |
| 5,591,949 A | 1/1997 | Bernstein | |
| 5,613,012 A | 3/1997 | Hoffman et al. | |
| 5,615,277 A | 3/1997 | Hoffman | |
| 5,659,616 A | 8/1997 | Sudia | |
| 5,729,220 A | 3/1998 | Russell | |
| 5,784,463 A | 7/1998 | Chen et al. | |
| 5,805,719 A | 9/1998 | Pare, Jr. et al. | |
| 5,825,352 A | 10/1998 | Bisset et al. | |
| 5,835,079 A | 11/1998 | Shieh | |
| 5,838,812 A | 11/1998 | Pare, Jr. et al. | |
| 5,870,723 A | 2/1999 | Pare, Jr. et al. | |
| 5,872,848 A | 2/1999 | Romney et al. | |
| 5,880,411 A | 3/1999 | Gillespie et al. | |
| 5,920,640 A | 7/1999 | Salatino et al. | |
| 5,930,804 A | 7/1999 | Yu et al. | |
| 5,952,641 A | 9/1999 | Korshun | |
| 5,991,408 A | 11/1999 | Pearson et al. | |
| 6,038,666 A | 3/2000 | Hsu et al. | |
| 6,041,410 A | 3/2000 | Hsu et al. | |
| 6,076,167 A | 6/2000 | Borza | |
| 6,084,968 A | 7/2000 | Kennedy et al. | |
| 6,154,879 A | 11/2000 | Pare, Jr. et al. | |
| 6,167,517 A | 12/2000 | Gilchrist et al. | |
| 6,181,803 B1 | 1/2001 | Davis | |
| 6,182,221 B1 | 1/2001 | Hsu et al. | |
| 6,185,316 B1 | 2/2001 | Buffam | |
| 6,188,391 B1 | 2/2001 | Seely et al. | |
| 6,201,484 B1 | 3/2001 | Russell | |
| 6,202,151 B1 | 3/2001 | Musgrave et al. | |
| 6,219,793 B1 | 4/2001 | Li et al. | |
| 6,256,737 B1 | 7/2001 | Bianco et al. | |
| 6,268,788 B1 | 7/2001 | Gray | |
| 6,282,649 B1 | 8/2001 | Lambert et al. | |
| 6,310,610 B1 | 10/2001 | Beaton et al. | |
| 6,310,966 B1 | 10/2001 | Dulude et al. | |
| 6,317,834 B1 | 11/2001 | Gennaro et al. | |
| 6,323,846 B1 | 11/2001 | Westerman et al. | |
| 6,353,889 B1 | 3/2002 | Hollingshead | |
| 6,356,753 B1 | 3/2002 | Kolev et al. | |
| 6,366,682 B1 | 4/2002 | Hoffman et al. | |
| 6,367,013 B1 | 4/2002 | Bisbee et al. | |
| 6,367,017 B1 | 4/2002 | Gray | |
| 6,397,198 B1 | 5/2002 | Hoffman et al. | |
| 6,446,210 B1 | 9/2002 | Borza | |
| 6,466,781 B1 | 10/2002 | Bromba et al. | |
| 6,484,260 B1 | 11/2002 | Scott et al. | |
| 6,487,662 B1 | 11/2002 | Kharon et al. | |
| 6,490,680 B1 | 12/2002 | Scheidt et al. | |
| 6,505,193 B1 | 1/2003 | Musgrave et al. | |
| 6,529,885 B1 | 3/2003 | Johnson | |
| 6,532,298 B1 | 3/2003 | Cambier et al. | |
| 6,550,012 B1 | 4/2003 | Villa et al. | |
| 6,581,161 B1 | 6/2003 | Byford | |
| 6,587,945 B1 | 7/2003 | Pasieka | |
| 6,601,172 B1 | 7/2003 | Epstein | |
| 6,609,198 B1 | 8/2003 | Wood et al. | |
| 6,615,264 B1 | 9/2003 | Stoltz et al. | |
| 6,618,806 B1 | 9/2003 | Brown et al. | |
| 6,636,973 B1 | 10/2003 | Novoa et al. | |
| 6,657,538 B1 | 12/2003 | Ritter | |
| 6,662,166 B2 | 12/2003 | Pare, Jr. et al. | |
| 6,668,332 B1 | 12/2003 | McNeil | |
| 6,671,808 B1 | 12/2003 | Abbott et al. | |
| 6,681,034 B1 | 1/2004 | Russo | |
| 6,690,387 B2 | 2/2004 | Zimmerman et al. | |
| 6,719,200 B1 | 4/2004 | Wiebe | |
| 6,728,881 B1 | 4/2004 | Karamchetty | |
| 6,735,695 B1 | 5/2004 | Gopalakrishnan et al. | |
| 6,751,734 B1 | 6/2004 | Uchida | |
| 6,757,411 B2 | 6/2004 | Chau | |
| 6,765,470 B2 | 7/2004 | Shinzaki | |
| 6,766,040 B1 | 7/2004 | Catalano et al. | |
| 6,775,776 B1 | 8/2004 | Vogt et al. | |
| 6,786,397 B2 | 9/2004 | Silverbrook et al. | |
| 6,816,970 B2 | 11/2004 | Morgan et al. | |
| 6,819,219 B1 | 11/2004 | Bolle et al. | |
| 6,820,202 B1 | 11/2004 | Wheeler et al. | |
| 6,829,711 B1 | 12/2004 | Kwok et al. | |
| 6,832,317 B1 | 12/2004 | Strongin et al. | |
| 6,834,351 B1 | 12/2004 | Kabenjian | |
| 6,836,765 B1 | 12/2004 | Sussman | |
| 6,836,843 B2 | 12/2004 | Seroussi et al. | |
| 6,839,688 B2 | 1/2005 | Drummond et al. | |
| 6,844,660 B2 | 1/2005 | Scott | |
| 6,848,052 B2 | 1/2005 | Hamid et al. | |
| 6,850,147 B2 | 2/2005 | Prokoski et al. | |
| 6,850,252 B1 | 2/2005 | Hoffberg | |
| 6,853,739 B2 | 2/2005 | Kyle | |
| 6,853,988 B1 | 2/2005 | Dickinson et al. | |
| 6,857,073 B2 | 2/2005 | French et al. | |
| 6,862,443 B2 | 3/2005 | Witte | |
| 6,870,946 B1 | 3/2005 | Teng et al. | |
| 6,870,966 B1 | 3/2005 | Silverbrook et al. | |
| 6,871,193 B1 | 3/2005 | Campbell et al. | |
| 6,871,287 B1 | 3/2005 | Ellingson | |
| 6,871,784 B2 | 3/2005 | Jayaratne et al. | |
| 6,876,757 B2 | 4/2005 | Yau et al. | |
| 6,877,097 B2 | 4/2005 | Hamid et al. | |
| 6,879,243 B1 | 4/2005 | Booth et al. | |
| 6,879,966 B1 | 4/2005 | Lapsley et al. | |
| 6,880,749 B1 | 4/2005 | Green et al. | |
| 6,880,750 B2 | 4/2005 | Pentel | |
| 6,883,709 B2 | 4/2005 | Joseph et al. | |
| 6,886,096 B2 | 4/2005 | Appenzeller et al. | |
| 6,886,101 B2 | 4/2005 | Glazer et al. | |
| 6,886,104 B1 | 4/2005 | McClurg et al. | |
| 6,888,445 B2 | 5/2005 | Gotfried et al. | |
| 6,898,577 B1 | 5/2005 | Johnson | |
| 6,901,154 B2 | 5/2005 | Dunn | |
| 6,901,155 B2 | 5/2005 | Xia et al. | |
| 6,901,266 B2 | 5/2005 | Henderson | |
| 6,901,382 B1 | 5/2005 | Richards et al. | |
| 6,914,517 B2 | 7/2005 | Kinsella et al. | |
| 6,957,185 B1 | 10/2005 | Labaton | |
| 6,957,337 B1 | 10/2005 | Chainer et al. | |
| 6,959,382 B1 | 10/2005 | Kinnis et al. | |
| 6,963,659 B2 | 11/2005 | Tumey et al. | |
| 6,985,502 B2 | 1/2006 | Bunton | |
| 6,990,444 B2 | 1/2006 | Hind et al. | |
| 7,015,894 B2 | 3/2006 | Morohoshi et al. | |
| 7,024,562 B1 | 4/2006 | Flink et al. | |

(56) References Cited

U.S. PATENT DOCUMENTS

| | | | |
|---|---|---|---|
| 7,028,191 B2 | 4/2006 | Michener et al. |
| 7,035,442 B2 | 4/2006 | Ha et al. |
| 7,069,444 B2 | 6/2006 | Lowensohn et al. |
| 7,111,173 B1 | 9/2006 | Scheidt |
| 7,184,064 B2 | 2/2007 | Zimmerman et al. |
| 7,287,158 B2 | 10/2007 | Futamura et al. |
| 7,305,562 B1 | 12/2007 | Bianco et al. |
| 7,310,734 B2 | 12/2007 | Boate et al. |
| 7,590,861 B2 | 9/2009 | Abdallah et al. |
| 7,613,659 B1 | 11/2009 | Hoffman et al. |
| 7,663,607 B2 | 2/2010 | Hotelling et al. |
| 7,689,832 B2 | 3/2010 | Talmor et al. |
| 7,788,501 B2 | 8/2010 | Abdallah et al. |
| 8,001,372 B2 | 8/2011 | Abdallah et al. |
| 8,055,906 B2 | 11/2011 | Abdallah et al. |
| 8,127,143 B2 | 2/2012 | Abdallah et al. |
| 8,407,480 B2 | 3/2013 | Abdallah et al. |
| 8,478,992 B2 | 7/2013 | Abdallah et al. |
| 8,479,122 B2 | 7/2013 | Hotelling et al. |
| 8,522,011 B2 * | 8/2013 | Spalka .............. H04L 9/3236 713/156 |
| 8,550,339 B1 | 10/2013 | Newman et al. |
| 8,638,939 B1 | 1/2014 | Casey et al. |
| 8,826,031 B2 | 9/2014 | Abdallah et al. |
| 9,160,537 B2 | 10/2015 | Abdallah et al. |
| 9,270,464 B2 | 2/2016 | Abdallah et al. |
| 9,716,698 B2 | 7/2017 | Abdallah et al. |
| 2001/0001876 A1 | 5/2001 | Morgan et al. |
| 2001/0034836 A1 | 10/2001 | Matsumoto et al. |
| 2002/0003892 A1 | 1/2002 | Iwanaga |
| 2002/0018585 A1 | 2/2002 | Kim |
| 2002/0023217 A1 | 2/2002 | Wheeler et al. |
| 2002/0025044 A1 | 2/2002 | Saito |
| 2002/0026427 A1 | 2/2002 | Kon et al. |
| 2002/0031230 A1 | 3/2002 | Sweet et al. |
| 2002/0034319 A1 | 3/2002 | Tumey et al. |
| 2002/0056043 A1 | 5/2002 | Glass |
| 2002/0087857 A1 | 7/2002 | Tsao et al. |
| 2002/0095586 A1 | 7/2002 | Doyle et al. |
| 2002/0104006 A1 | 8/2002 | Boate et al. |
| 2002/0104025 A1 | 8/2002 | Wrench, Jr. |
| 2002/0129236 A1 | 9/2002 | Nuutinen |
| 2002/0129251 A1 | 9/2002 | Itakura et al. |
| 2002/0133716 A1 | 9/2002 | Harif |
| 2002/0150241 A1 | 10/2002 | Scheidt et al. |
| 2002/0174344 A1 | 11/2002 | Ting |
| 2002/0176583 A1 | 11/2002 | Buttiker |
| 2002/0186838 A1 | 12/2002 | Brandys |
| 2003/0005310 A1 | 1/2003 | Shinzaki |
| 2003/0089764 A1 | 5/2003 | Meadow et al. |
| 2003/0097586 A1 | 5/2003 | Mok |
| 2003/0101349 A1 | 5/2003 | Wang |
| 2003/0115475 A1 | 6/2003 | Russo et al. |
| 2003/0115490 A1 | 6/2003 | Russo et al. |
| 2003/0140233 A1 | 7/2003 | Samar |
| 2003/0200257 A1 | 10/2003 | Milgramm et al. |
| 2003/0226015 A1 | 12/2003 | Neufeld et al. |
| 2003/0233556 A1 | 12/2003 | Angelo et al. |
| 2004/0015958 A1 | 1/2004 | Veil et al. |
| 2004/0044627 A1 | 3/2004 | Russell et al. |
| 2006/0197753 A1 | 9/2006 | Hotelling |
| 2007/0124597 A1 | 5/2007 | Bedingfield, Sr. |
| 2008/0230598 A1 | 9/2008 | Bodin |
| 2009/0030778 A1 | 1/2009 | Zapata et al. |
| 2009/0031140 A1 | 1/2009 | Abdallah et al. |
| 2009/0037745 A1 | 2/2009 | Abdallah et al. |
| 2009/0037746 A1 | 2/2009 | Abdallah et al. |
| 2009/0320123 A1 | 12/2009 | Yu et al. |
| 2010/0005315 A1 | 1/2010 | Abdallah et al. |
| 2011/0313779 A1 | 12/2011 | Herzog et al. |
| 2012/0047370 A1 | 2/2012 | Abdallah et al. |
| 2012/0124662 A1 | 5/2012 | Baca et al. |
| 2013/0160088 A1 | 6/2013 | McFarland |
| 2014/0237256 A1 | 8/2014 | Ben Ayed |
| 2014/0289833 A1 | 9/2014 | Briceno et al. |
| 2016/0065373 A1 | 3/2016 | Abdallah et al. |

FOREIGN PATENT DOCUMENTS

| | | |
|---|---|---|
| JP | 2002342033 | 11/2002 |
| WO | 9908238 | 2/1999 |
| WO | 0065770 | 11/2000 |
| WO | 0141032 | 7/2001 |
| WO | 0192994 | 12/2001 |
| WO | 2004014017 | 2/2004 |

OTHER PUBLICATIONS

U.S. Appl. No. 15/171,951, "Notice of Allowance", dated Aug. 15, 2018, 17 pages.

U.S. Appl. No. 15/174,251, "Non-Final Office Action", dated Mar. 7, 2018, 12 pages.

U.S. Appl. No. 15/174,251, "Notice of Allowance", dated Sep. 6, 2018, 5 pages.

Davida et al., "On Enabling Secure Applications through Offwline Biometric Identification", Security and Privacy, Proceedings of the 1998 IEEE Symposium, May 1998, pp. 148-157.

Guse et al., "Gesture-based User Authentication for Mobile Devices using Accelerometer and Gyroscope", Conference Paper, Available online at: http://www.researchgate.net/publication/235988370, Mar. 2012, 4 pages.

Isobe et al., "Development of Personal Authentication System using Fingerprint with Digital Signature Technologie", Proceedings of the 34th Hawaii International Conference on System Sciences, Jan. 2001, pp. 1-9.

Komatsu, "PKI Handbook", Soft Research Center Inc., Nov. 25, 2000, pp. 105-108.

Lee et al., "A Muiti-Touch Three Dimensional Touch-Sensitive Tablet", Proceedings of CHI: ACM Conference on Human Factors in Computing Systems, Apr. 1985, pp. 21-25.

Rubine, "Combining Gestures and Direct Manipulation", CHI '92, May 3-7, 1992, pp. 659-660.

Rubine, "The Automatic Recognition of Gestures", CMU-CS-91-202, Submitted in Partial Fulfillment of the Requirements for the Degree of Doctor of Philosophy in Computer Science at CarneQie Mellon University, Dec. 1991, 285 pages.

Schneier, "Applied Cryptography: Protocols, Algorithms, and Source Code in C", Second Edition, John Wiley & Sons, Inc.,, 1996, pp. 31-34.

Vadhan, "A Study of Statistical Zero-Knowledge Proofs", Massachusetts Institute of Technology, Sep. 1999, 190 pages.

Westerman, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

\* cited by examiner

ESTABLISHING AND VERIFYING IDENTITY USING BIOMETRICS WHILE PROTECTING USER PRIVACY

CROSS-REFERENCES TO RELATED APPLICATIONS

This application is a continuation-in-part of U.S. patent application Ser. No. 16/211,155, filed Dec. 5, 2018, which is a continuation-in-part of U.S. patent application Ser. No. 15/174,251, filed on Jun. 6, 2016, which claims the benefit of U.S. Provisional Application No. 62/172,006, filed Jun. 5, 2015, entitled "Establishing and Verifying Identity Using Private Biometrics." The disclosure of these applications are incorporated by reference herein in their entirety.

The present disclosure is related to commonly-assigned U.S. Provisional Application No. 62/171,998, filed Jun. 5, 2015, the disclosure of which is incorporated herein by reference.

BACKGROUND

The present disclosure relates generally to data security and in particular to establishing and verifying the identity of a person using biometrics while protecting user privacy.

Individuals are conducting more and more activity online, from banking to commerce to data storage and retrieval. In a situation where an individual is likely to conduct multiple transactions with a particular service provider, the individual is typically invited to establish a user account with the service provider. The user account can store personal information about the individual user (e.g., name, email address, surface mail address, phone number, billing information such as a credit card number, and so on). In some instances, having an account may be required to use the services of the service provider.

For a number of reasons, it is desirable to protect user accounts from being accessed by anyone other than the authorized user. Accordingly, account creation typically includes establishing a user identifier (e.g., a so-called "username") and a security credential (e.g., a password) for the account. The security credential is intended to be kept secret from everyone except the authorized user (and in some instances the service provider, depending on the security protocols used). In a "normal" login procedure defined by the service provider, the user can access the account by presenting the username and security credential (or satisfactory proof of having the security credential, depending on the security protocols) to the service provider.

Such protection is known to be less than perfect. For example, a user may forget the password or lose a device on which the password is stored, which can prevent the user from accessing the account using the normal login procedure. Or in some cases, the secrecy of a security credential may be compromised (e.g., a password can be stolen), which may allow unauthorized parties to access the user account. This can result in the service provider blocking normal login access to the user account.

Some service providers, therefore, find it useful to allow the user to enroll the user account in an account recovery service. The account recovery service can define alternative protocols for verifying the user's identity in case the normal login procedure becomes unusable. If these alternative protocols are completed successfully, the user can be allowed to access the account despite not having or not being allowed to use the established security credential. One commonly used account-recovery protocol is based on "challenge-response" security questions. At enrollment time, the user can be prompted to provide answers to a set of security questions, the answers to which are assumed to be easy for the user to recall but difficult for would-be impostors to determine. Typical security questions include "What was the model of your first car?" or "What was your first pet's name?" The service provider stores the answers given at enrollment time, and the user can verify her identity at a later time by providing a matching set of answers. However, to the extent that the answers to typical challenge-response questions can be found out by someone other than the user who answered them, this protocol may allow unauthorized persons to access a user account.

Another identity-verification protocol involves using alternative contact information included in the user account record to verify that a request for access originates with the authorized user. For example, if the user indicates to the service provider that her password has been lost, the service provider can send a message to an email address or phone number included in the user account record. The message can contain a secret confirmation code that the user can provide back to the service provider to prove that she is the authorized user—or at least that she has access to the authorized user's phone or email account. Such methods can be problematic if the user has also lost access to a phone or email account (or if someone else has gained access).

SUMMARY

Certain embodiments of the present invention relate to techniques for establishing and verifying a user's identity using biometric information of the user and a security protocol that avoids any sharing of the user's biometric information. (Hence, the biometrics are said to be "private.") For example, a user enrolling in an account recovery service or an identity verification service can operate her personal device to collect various biometric data (e.g., data pertaining to fingerprints, facial features, ear features, voice print, retina scan, etc.). The user's device can execute an algorithm to convert the biometric data to an input data set for a cryptographic key-pair generation algorithm (which can be a deterministic algorithm such that the same inputs produce the same output). The key-pair generation algorithm, which can also execute on the user's device can generate a set of N public/private key pairs (where N is an arbitrary number and can be large, e.g., on the order of 100, 500, or more) in a manner such that none of the biometric data or any other user-identifying information can be extracted from the public/private key pairs. For instance, the key-pair generation algorithm can introduce a random salt or other random information so that multiple different sets of N public/private key pairs can be generated from the same input data set. The user device can send the N public keys and the random salt (but not the input data set or the biometric data) to a server operated by the service provider for storage and can destroy the private keys. The server can store the N public keys as account recovery keys. Later, when the user wants to verify her identity, e.g., to recover access to the account or for other purposes, a "recovery device" or "verification device" (which can be the same user device or a different device) can repeat the operations of collecting the biometric data, converting the biometric data to an input data set, and generating another set of N public/private key pairs using the same random salt that was used at enrollment. The same algorithms can be used, so that if the biometric data and the salt are identical between the two sets of measurements, the second set of public/private key pairs will exactly match the first.

In general, it is expected that biometric data collected from the same person will not be identical from one set of measurements to the next (especially if two different devices are used to make the measurements). Accordingly, in some embodiments, recovery can proceed without requiring all N keys to match the first set. Instead, the recovery device can be required to prove to the server that at least a minimum fraction (K/N, for some number K<N) of the second set of key pairs matches the first set of public keys. The minimum fraction can be chosen by the server and can be based on a risk profile associated with the user account, so that different users may be subject to different minimum fractions. Other thresholds for proof can also be applied. For instance, different key pairs can be assigned different weights and the threshold of proof can be based on the sum of weights of the matched keys.

In some embodiments, the user may be able to perform the enrollment process at a location of her choosing, using her own device (assuming the device has appropriate sensors for gathering the biometric data). The user can be (but need not be) required to perform the verification process under controlled circumstances, e.g., at a location where an individual trusted by the service provider can monitor the user's behavior to prevent attempts to fool the biometric sensors of the recovery device.

Any number and combination of biometric data can be collected and used to generate key pairs. The data set can be large enough to support generation of a very large number of distinct keys (so that it is unlikely for an impostor to guess the correct keys). In some embodiments, the data set can be enlarged by using multiple different types of biometric data (e.g., fingerprints of multiple fingers, a fingerprint plus facial features, facial features and a voice print, and so on) and/or a large number of attempts to collect the same or similar biometric data (e.g., a video of the user's face, which can provide dozens or hundreds of images from which data quantifying facial features can be extracted). In some embodiments, the data set can be further enlarged by making the order in which biometric data is collected a feature of the data set, so that, for example, presenting a thumb to a fingerprint scanner followed by an index finger results in generating different keys from presenting the index finger first. The user can choose a sequence of biometrics to present at enrollment and can provide the same sequence at verification time.

In some embodiments, the ability to verify a user's identity based on an action sequence can be used to allow the user to recover access to an account, e.g., when the user has forgotten a password. In addition or instead, the ability to verify a user's identity based on an action sequence can be used in any situation where verification of a user's identity is desirable. In some embodiments, an identity server system can provide an identity verification service to one or more other server systems, including server systems operated by third parties. In all cases, it is possible to verify the user's identity while preserving user privacy: the user's device can collect the biometric data, introduce a random salt, and generate the N public/private key pairs from the biometric data and the random salt, using an algorithm such that no information about the biometric data is recoverable from the public/private key pairs. The algorithm can also be designed such that repeating the algorithm with the same biometric data and a different random salt produces a different set of N public/private key pairs. Thus, the user's device can provide portion (or all) of the key pairs to an identity server without revealing personal information about the user.

The following detailed description together with the accompanying drawings will provide a better understanding of the nature and advantages of the present invention.

DETAILED DESCRIPTION

Figure 1:
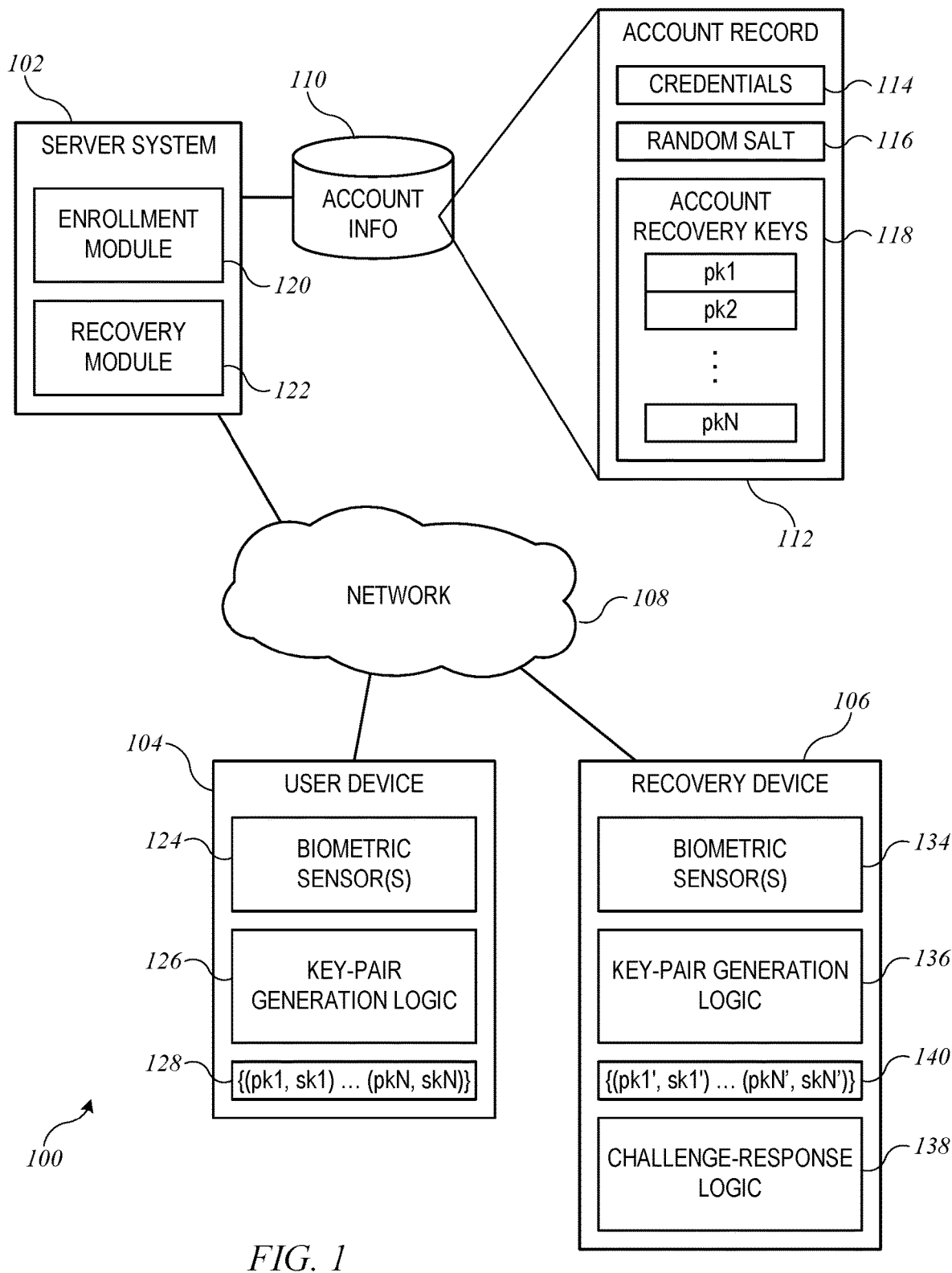
FIG. 1 shows a system according to an embodiment of the present invention.

Certain embodiments of the present invention relate to techniques for establishing and verifying a user's identity using biometric information of the user and a security protocol that avoids any sharing of the user's biometric information. (Hence, the biometrics are said to be "private.") For example, a user enrolling in an account recovery service or an identity verification service can operate her personal device to collect various biometric data (e.g., data pertaining to fingerprints, facial features, ear features, voice print, retina scan, etc.). The user's device can execute an algorithm to convert the biometric data to an input data set for a cryptographic key-pair generation algorithm (which can be a deterministic algorithm such that the same inputs produce the same output). The key-pair generation algorithm, which can also execute on the user's device can generate a set of N public/private key pairs (where N is an arbitrary number and can be large, e.g., on the order of 100, 500, or more) in a manner such that none of the biometric data or any other user-identifying information can be extracted from the public/private key pairs. For instance, the key-pair generation algorithm can also introduce a random salt or other random information so that multiple different sets of N public/private key pairs can be generated from the same input data set. The user device can send the N public keys and the random salt (but not the input data set or the biometric data) to a server operated by the service provider for storage and can destroy the private keys. The server can store the N public keys as account recovery keys. Later, when the user wants to verify her identity, e.g., to recover access to the account or for other purposes, a "recovery device" or "verification device" (which can be the same user device or a different device) can repeat the operations of collecting the biometric data, converting the biometric data to an input data set, and generating another set of N public/private key pairs using the same random salt that was used at enrollment. The same algorithms can be used, so that if the biometric data and the salt are identical between the two sets of measurements, the second set of public/private key pairs will exactly match the first.

In general, it is expected that biometric data collected from the same person will not be identical from one set of measurements to the next (especially if two different devices are used to make the measurements). Accordingly, in some embodiments, recovery can proceed without requiring all N keys to match the first set. Instead, the recovery device can be required to prove to the server that at least a minimum fraction (K/N, for some number K<N) of the second set of key pairs matches the first set of public keys. The minimum fraction can be chosen by the server and can be based on a risk profile associated with the user account, so that different users may be subject to different minimum fractions. Other considerations can be applied.

FIG. 1 shows a system 100 according to an embodiment of the present invention. System 100 can include a server system 102 communicating with a user device 104 and a recovery device 106 via a network 108. Network 108 can be a wide-area network, e.g., the Internet.

Server system 102 can include a server or server farm operated by or on behalf of a service provider. Depending on implementation, the service provider can be capable of providing various types of service to users. For example, the service provider can provide "cloud-based" data storage and retrieval services (e.g., data backup services, storage of large files, storage of shared files), commercial services (e.g., purchasing of goods), communication services (e.g., email, text messaging, instant messaging), social media services (e.g., blog hosting, microblogging, etc.), financial services (e.g., banking or payment services), media access services (e.g., streaming music and/or video) or any other type of service that a user may interact with on a repeat basis.

To facilitate repeat interactions, a user operating user device 104 can establish a user account with server system 102. Server system 102 can maintain user account information in an account information repository 110, which can be implemented, e.g., using mass storage devices and database management software. User account information for a specific user account can be stored, e.g., in a user account record 112. As shown, user account record 112 can include account credentials 114. Account credentials 114 can include, for instance, a username (or login ID) and password for the account, which can be established when the user creates the account. For instance, the user can be prompted to provide a username and password that the user is expected to remember. In some embodiments, the password can be treated as a protected secret that is not transmitted as cleartext and is not stored as cleartext by server system 102. In some embodiments, the user may be able to update account credentials 114 from time to time (e.g., changing the password). In a "normal" login procedure defined for server system 102, user device 104 can present account credentials 114 to server system 102 and thereby obtain access to services offered through server system 102. The normal login procedure can incorporate conventional authentication processes and/or other processes as desired.

In addition to account credentials 114, user account record 112 can also include account recovery data such as a random salt 116 and a set of N "recovery keys" 118 (for an integer N that can be selected by the operator of server system 102 as described below). Each recovery key in set 118 can be a "public key" usable in a public-key cryptography operation. Random salt 116 and recovery key set 118 can be generated during an enrollment process, examples of which are described below. Subsequently to enrollment, if a user becomes unable to access the account through the normal login procedure using account credentials 114, random salt 116 and recovery key set 118 can be used in a recovery process that, if successful, allows an authorized user to re-establish access to the account through the normal login procedure (e.g., by establishing new account credentials 114). Examples of recovery processes are described below. It is to be understood that user account record 112 can also include or reference other information not shown (e.g., user contact information, transaction history information, stored data, and any other type of information that may be relevant depending on the particular services associated with the user account); details of such information are not relevant to the present disclosure.

Server system 102 can incorporate various logic modules, each of which can be implemented in program code executed on suitable hardware. The logic modules can support interaction of user device 104 and/or recovery device 106 with server system 102. For example, server system 102 can incorporate an enrollment module 120 and a recovery module 122. It is to be understood that server system 102 can also incorporate other modules implementing specific services that may be supported by server system 102 (e.g., catalog browsing, purchasing, querying a database, streaming media, publishing content, etc.); details of such modules are not relevant to the present disclosure.

Enrollment module 120 can be invoked to allow a user to establish an account and/or to enroll in an account recovery service. In some embodiments, the enrollment process can include user device 104 generating random salt 116 and recovery key set 118 and providing this information to server system 102 to be stored in account record 112. Recovery module 122 can be invoked at a later time to allow a user who is unable to use the normal login procedure to access the account to attempt to re-establish access by demonstrating sufficient knowledge of a set of private keys corresponding to the public keys in recovery key set 118. Specific examples of enrollment and recovery processes that can be implemented in enrollment module 120 and recovery module 122 are described below.

User device 104 can include any type of user-operable electronic device that is capable of communicating with server system 102 via network 108. For example, user device 104 can be a desktop computer, laptop computer, smart phone, other mobile phone, tablet computer, wearable computing device, or the like. User device 104 can include one or more biometric sensors 124 capable of generating biometric data based on some biometric identifier of the user (e.g., a fingerprint, facial features, voice print, ear print, or any other anatomical or physiological characteristic that can be used to distinguish among different individuals). Examples of biometric sensors 124 can include fingerprint sensors capable of generating digital data representing distinctive features of a pattern of ridges and valleys detected on the user's fingertip, image sensors (e.g., cameras) capable of capturing still or video images of the user's face (or other body parts) and generating digital data representing distinctive characteristics of the user's face (or other body parts), audio sensors capable of capturing speech and generating digital data representing the sound of the speech, and so on. Any number and combination of biometric sensors 120 can be present.

User device 104 can also include key-pair generation logic 126. Key-pair generation logic 126 can be implemented, e.g., in program code that can be supplied to user device 104 by server system 102 and executed on user device 104. For example, when the user establishes an account with server system 102 or opts to enroll in an account recovery service of server system 102 that uses biometric data, server system 102 may prompt the user to download and install an application program that implements key-pair generation logic 126 (and in some instances other operations related to interacting with server system 102). In some embodiments, an operator of server system 102 may be affiliated with a manufacturer of user device 104, and key-pair generation logic 126 can be provided, e.g., as a component of operating system software installed on user device 104. In some embodiments, key-pair generation logic can be implemented in hardware.

In operation, key-pair generation logic 126 can receive biometric data (e.g., in digital form) from biometric sensor(s) 124 and can use the biometric data to generate a set of N public/private key pairs 128. As described below, key-pair generation can be performed such that the biometric data is not recoverable from the public/private key pairs 128. When the user enrolls in the account recovery service, e.g., by operating user device 104 to interact with enrollment module 120 of server system 102, key-pair generation logic 126 can be invoked as part of the enrollment process. Specific examples are described below. User device 104 can transmit the public keys {pk1 ... pkN} of the generated key pairs 128 (and other information such as random salt 116, but not including the private keys {sk1 ... skN}) to enrollment module 120 to be added to user account record 112. In some embodiments, a user may have the option to re-enroll, in which case, key-pair generation logic 126 can be invoked again to generate a new set of public/private key pairs 128. User device 104 can communicate the new public keys to enrollment module 120, which can replace the previously stored public keys with the new set. As described below, user device 104 does not need to retain any of the public keys or private keys generated by key-pair generation logic 126. Instead, as described below, new key pairs can be generated later and used for recovery.

Recovery device 106 can be any device that can interact with recovery module 122 and with a user to facilitate recovery of access to a user account. In some embodiments, recovery device 106 can be similar or identical to user device 104 (e.g., any electronic device of the user). In some embodiments, recovery device 106 can be a device located in a controlled environment. For example, recovery device 106 can be located in a retail store or other location where an individual trusted by the service provider can monitor the user's behavior during the recovery process and can perform independent confirmation of the user's identity (e.g., by checking the user's driver's license or other identification card). The presence of a trusted individual during the recovery process can help to prevent impostors from attempting to fool recovery module 122 by presenting falsified biometrics (e.g., fingerprints molded on a silicone polymer substrate or the like) to recovery device 106.

Recovery device 106 can include one or more biometric sensors 134, which can be similar in design and operation to biometric sensors 124 of user device 104. For reasons that will become apparent, it may be desirable to use the same sensor types in both devices. Thus, for instance, in some embodiments, such as where recovery device 106 is located in a controlled environment and may be used by different users who established their recovery keys 118 on different devices with different sensors, recovery device 106 can implement different sensors compatible with different user devices 104. Alternatively, the controlled environment can provide a number of different recovery devices 106, each matched to a different type of user device 104 (e.g., different generations of a particular line of smart phones).

Recovery device 106 can also include key-pair generation logic 136. Key-pair generation logic 136 can be implemented in program code that can be supplied to recovery device 106 by server system 102. Key-pair generation logic 136 can be identical in its operation to key-pair generation logic 126, at least to the extent that the same input data set yields the same set of public/private key pairs.

Recovery device 106 can also include challenge-response logic 138. Challenge-response logic 138 can be used to support a zero-knowledge probabilistic ("ZKP") proof protocol via which recovery device 106 (acting as the "prover") can prove to recovery module 122 of server system 102 (acting as the "verifier") that it is in possession of a set of private keys that match account recovery (public) key set 118, to an acceptable level of confidence that both sets of key pairs were generated from the same underlying biometric data, without transferring any knowledge of the biometric data from the prover to the verifier. For instance, recovery device 106 may be required to prove that it is in possession of at least a minimum fraction of the key pairs. Examples are described below.

In operation, a user who wants to recover access to an account represented by account record 112 can present one or more biometric identifiers (e.g., fingerprints, facial features, voice print, etc.) to recovery device 106. Biometric sensors 134 can generate biometric data from the biometric identifier(s). Key-pair generation logic 136 can generate a new set of public/private key pairs 140, using the biometric data generated by biometric sensors 134 and the same algorithms used by key-pair generation logic 126. Challenge-response logic 138 can use the private keys of the new set of key pairs 140 to respond to challenges posed by recovery module 122. Recovery module 122 can evaluate the responses using the stored public key set 118.

Because the private keys used by challenge-response logic 138 were presumably generated at a different time, on a different device, and under different conditions (e.g., different lighting) from stored public key set 118, it is likely that new public/private key set 140 will not be identical to enrollment public/private key set 128, even if the same user provided the biometric identifiers in both instances. Accordingly, recovery module 122 can implement a zero-knowledge probabilistic ("ZKP") proof protocol that permits a nonzero error rate in the responses from challenge-response logic 138. For example, the protocol can require recovery device 106 to prove that it has possession of at least a minimum number K of the N private keys, for some K<N. Recovery module 122 can, for instance, generate a set of N random challenge messages, each to be signed by recovery device 106 using a different one of its private keys. Based on the responses, recovery module 122 can make a match or no-match determination for each key and can require that matches are achieved for at least K of the N keys. The value of K can be selected such that the risk of granting account access to someone who is not in fact the authorized user is reduced to an acceptable level. Those skilled in the art will recognize that the exact definition of acceptable risk will depend on the implementation (e.g., what type of information is stored in the user account or what type of transactions a user can perform with server system 102); some relevant factors and examples are described below.

It will be appreciated that system 100 is illustrative and that variations and modifications are possible. For instance, while one user device, one recovery device, and one user account record are shown, it is to be understood that any number of user devices, any number of recovery devices, any number of users, and any number of user account records can be present. A given user can have one or more user devices 104 via which the user accesses server system 102. A user with multiple user devices 104 can enroll in account recovery using one device 104 and does not need to enroll separately on every device. The particular choice of biometric sensors and biometric identifiers can be varied; examples are described below.

Figure 2:
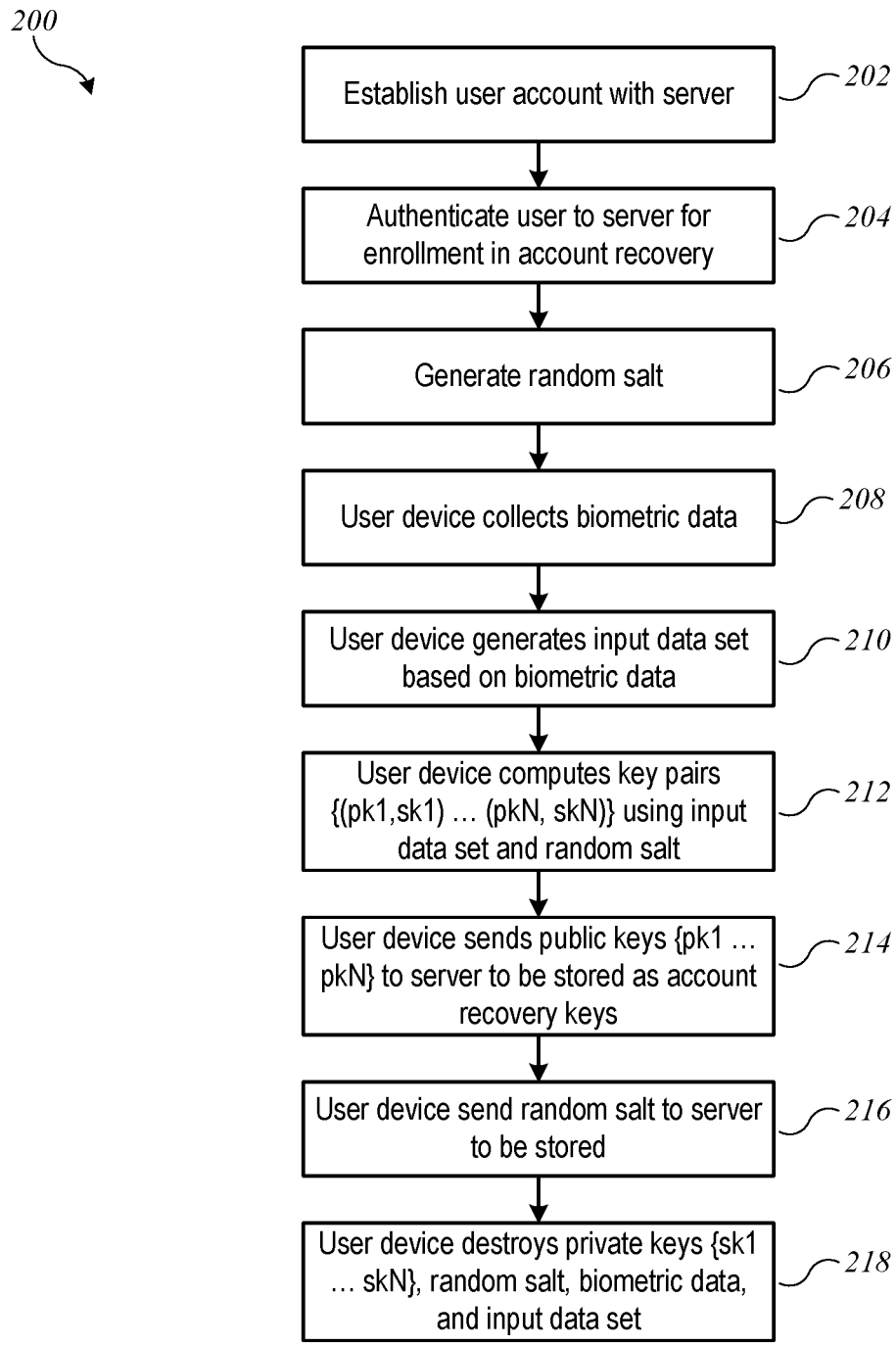
FIG. 2 shows a flow diagram of an enrollment process according to an embodiment of the present invention.

FIG. 2 shows a flow diagram of an enrollment process 200 according to an embodiment of the present invention. Enrollment process 200 can be implemented, e.g., on user device 104 interacting with enrollment module 120 of server system 102. Through execution of enrollment process 200, the user can establish a set of key pairs that can be later used to verify the user's identity.

Process 200 can begin at block 202, when a user account is established with server system 102. Establishing an account can include, e.g., user device 104 communicating with server system 102 to establish account credentials 114 (e.g., username and password) usable for a normal login procedure and to provide other user-specific information that may be requested or required by server system 102 (e.g., name, street address, email address, etc.). At block 204, which can be performed as part of establishing the account or at a later time as desired, the user can be authenticated to server system 102 for purposes of enrolling the user in account recovery, e.g., using account credentials 114 established at block 202. Enrollment in account recovery can happen at any time when server system 102 can establish satisfactory confidence that it is communicating with the authorized user of the user account, during or after account creation as desired. In some embodiments, authentication for purposes of enrolling the user in account recovery at block 204 can include additional actions beyond the normal login procedure. For instance, server system 102 can send a message including a random code to a device or email address associated with the user account and require the user to prove receipt of the message, e.g., by entering the random code into user device 104. Other authentication techniques can be used, and in some embodiments, a normal login procedure may suffice.

Once the user has been authenticated to server system 102, at block 206, a random salt for use in computing key pairs can be generated. For example, key-pair generation logic 126 of user device 104 can generate the random salt. At block 208, user device 104 can collect biometric data for the user using biometric sensor(s) 124.

Figure 3:
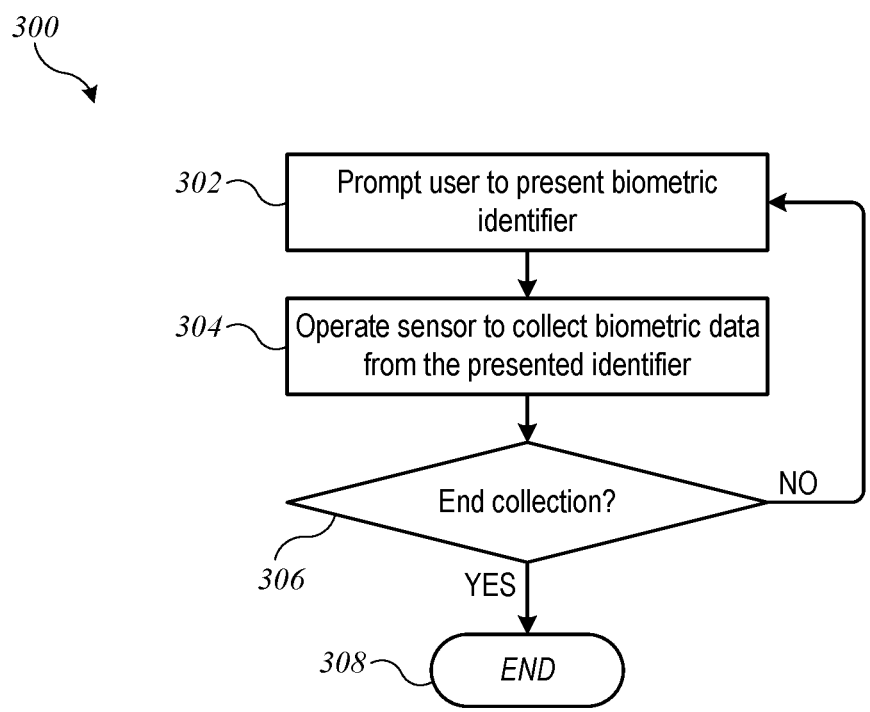
FIG. 3 shows a flow diagram of a biometric data collection process according to an embodiment of the present invention.

The particular data collection process can be varied, depending on the type(s) of biometric identifier(s) being used. FIG. 3 shows a flow diagram of a biometric data collection process 300 according to an embodiment of the present invention. Process 300 can be implemented, e.g., in user device 104 executing block 208 of process 200. In some embodiments, process 300 can allow the user to select the number and/or sequence of biometric identifiers to be used.

Process 300 can begin when the user is ready to input biometric data. For example, the user can indicate that enrollment in account recovery should be started. At block 302, user device 104 can prompt the user to present a biometric identifier to a sensor. For example, the user may be prompted to touch one or more fingers to a fingerprint sensor of user device 104, to hold user device 104 such that a camera of user device 104 can capture a still or video image of the user's face (or some portion thereof), or to speak into a microphone of user device 104. If the sequence of biometric identifiers to be used is fixed, user device 104 can prompt the user to present a specific identifier. In embodiments where the user selects the sequence of identifiers to use, user device 104 can first prompt the user to select an identifier type to be used (e.g., from a menu of options that can include fingerprint, facial recognition, voice print, or any other type of biometric identifier supported by biometric sensor(s) 124), then prompt the user to present the selected identifier to the appropriate sensor.

At block 304, user device 104 can operate biometric sensor(s) 124 to collect data from the identifier presented by the user. The particular data collection process can depend on the sensor and can include any process that generates a digital representation of one or more distinctive characteristics of the identifier that would distinguish the identifier from a similar identifier presented by a different individual. For example, if the identifier is a fingerprint, distinctive characteristics can correspond to the particular pattern of ridges and valleys, whorls, and so on. If the identifier is a face, distinctive characteristics can correspond to eye shape, eye spacing, size and shape of the nose, proportionality of different features, etc. As is generally the case with biometric identification, it is to be understood that a single distinctive characteristic need not be unique to the user, but a combination of distinctive characteristics may be sufficiently improbable of being found in anyone else to reliably distinguish the user from an impostor. Accordingly, any particular biometric can be represented using a "feature vector" that quantifies multiple measurable characteristics.

At block 306, user device 104 can determine whether biometric data collection should end. For example, if the length of the sequence of biometric identifiers is fixed, user device 104 can determine whether the end of the sequence has been reached. In embodiments where the user determines the length of the sequence, block 306 can include prompting the user to indicate whether to add another identifier or end data collection. If the end of the sequence has not been reached, process 300 can return to block 302 to continue to collect data. Once the end of the sequence is reached, process 300 can end at block 308. It is to be understood that the sequence of biometric identifiers can have any length and that some embodiments may rely on just one biometric identifier (e.g., a fingerprint or a facial pattern). Further, where a sequence of biometric identifiers is used, the order in which identifiers are presented can be part of the biometric data. Accordingly, the same user can generate different biometric data by presenting the same identifiers in a different order (e.g., presenting an index finger, then thumb can produce different data from presenting thumb first, then index finger). As will become apparent, including the order of identifiers in the biometric data can complicate the task for an impostor, who would need not only to present biometric identifiers that mimic the user's but also to do so in the same order that the user presented them during enrollment. It should be understood that biometric data can be collected locally on user device 104 and need not be communicated to or shared with any other device.

After completion of process 300 (or other biometric data collection processes), enrollment process 200 can continue. Referring again to FIG. 2, at block 210, user device 104 can generate an input data set based on the biometric data collected at block 208. Generating the input data set may include, e.g., applying normalization or scaling factors to various data values, quantizing data values, or performing other transform operations. Generation of the input data set can preserve a correlation between the biometric data and the input data set such that different biometric data (e.g., data collected from different individuals) produces a different input data set while the same biometric data produces the same input data set. In some embodiments, the input data set can be generated by key-pair generation logic 126.

At block 212, user device 104 can compute a set of N key pairs {(pk1, sk1), . . . (pkN, skN)} using the input data set generated at block 210 and the random salt generated at block 206. (In the notation used herein, "pki" for integer i denotes a public key and "ski" denotes the corresponding private, or secret, key.) Conventional (or other) algorithms for computing a cryptographic key pair for use in public key cryptography operations can be used, and the same algorithm (or different algorithms) can be repeated N times, using different (possibly overlapping) subsets of the input data set to generate N key pairs. The key generation process can be deterministic (such that the same input data set with the same random salt produces the same set of N key pairs) but unpredictable (such that any change to the input data set or random salt produces a different set of N key pairs, where the differences between the sets of key pairs cannot be used to reconstruct what the difference in the inputs was). The use of a random salt can allow the same user to generate a different set of N key pairs using the same biometric identifiers and the same algorithms; different (and uncorrelated) sets of N key pairs can be generated from the same biometrics by using different random salts. The ability to generate different (and uncorrelated) sets of N key pairs from the same underlying biometrics can be useful, e.g., in the event that the user needs to or chooses to re-enroll. It also provides additional security in the event that multiple services use the same verification process, as the user can generate a different set of key pairs for each service in which the user enrolls. In any case, the key generation process can be such that the input data set is not recoverable from the resulting key pairs even if the key-pair generation algorithm and the random salt are known.

The number (N) of key pairs can be selected as desired. As described below, the key pairs can be used in a zero knowledge probabilistic (ZKP) proof protocol in which a recovery device demonstrates possession of at least a threshold fraction of the key pairs. The number of key pairs and the threshold fraction together define a degree of confidence that the recovery device has the authorized user's biometrics. Accordingly, a large number of key pairs (e.g., N≥100) can be generated. In choosing N, consideration can also be given to the size of the "space" of possible key pairs, as defined by the amount of entropy in the input data set (roughly corresponding to the number of possible distinct input data sets). Thus, for example, if the biometric data is derived from a single fingerprint, the number of possible distinct input data sets may be smaller than if the biometric data is derived from multiple fingerprints or multiple features of the user's face. If N is a significant fraction of the size of the space of possible key pairs, then the risk of a false positive in the ZKP proof protocol occurring just by chance increases correspondingly. If the space of possible key pairs is large (e.g., $2^{128}$ or $2^{256}$), then N=100 or N=1000 can result in an acceptably small risk of false positive occurring by chance.

At block 214, user device 104 can send just the public key of each pair, i.e., {pk1, . . . pkN}, to server system 102 to be stored as recovery key set 118. At block 216, user device 102 can send the random salt that was generated at block 206 to server system 102 to be stored as random salt 116. In some embodiments, the only information sent by user device 104 to server system 102 during process 200 is the set of public keys and the random salt. The private keys and the biometric data from which they were computed need not leave user device 104. Thus, provided that the public keys cannot be used to reconstruct the biometric data, the privacy of the user's biometric data is protected against any attack on server system 102.

At block 218, user device 104 can destroy the set of private keys, i.e., {sk1, . . . skN}, the random salt, the biometric data collected at block 208 and the input data set generated at block 210. Any process that results in unrecoverable loss of this information can be used. Consequently, after completion of process 200, the only way to obtain private keys {sk1, . . . skN} would be by obtaining the random salt from server system 102, then repeating blocks 208-212 of process 200 using the same biometric identifier(s) of the same individual. Assuming the goal is to prevent unauthorized parties from gaining access to the user's account, this is a desirable state of affairs, as it may be much more difficult for an unauthorized party to match or reconstruct the user's biometric data than to hack into a user device or server where private keys (or biometric data usable to generate private keys) are stored. User device 104 can also destroy the public keys {pk1, . . . pkN} after sending them to server 102, as they are no longer of any use to user device 104. Thus, the privacy of the user's biometric data can also be protected against any attack on user device 104. In some embodiments, it may be desirable for user device 104 to store the input data in local storage; as described below, locally storing the input data can allow user device 104 to detect systematic drift in the user's biometric data across time.

Following completion of process 200, user device 104 can continue to access server system 102 using account credentials 114 in a normal login procedure (as defined by server system 102). Server system 102 can permit such access, e.g., for as long as server system 102 is not notified of any potential breach that may compromise the security of account credentials 114. Thus, there may be instances where a user creates a recovery key set 118 but never uses it.

There may also be instances where recovery is desirable. For instance, the user may forget some or all of account credentials 114 or lose a user device where they were stored (or otherwise lose access to the credentials). Additionally, various "lockout" events may occur, where a lockout event can include any occurrence that results in server system 102 denying all access to the user account via the normal login procedure, such that even presenting the correct account credentials 114 does not result in the user gaining access. Lockout events can occur, for example, if the operator of server system 102 receives information (from the user or other sources) indicating that an unauthorized party may have gained (or attempted to gain) access to account credentials 114 (e.g., by stealing a password list or a user device on which account credentials 114 were stored), or if a suspicious pattern of activity on the user account is detected, and so on. Where a lockout event occurs, the user may desire to recover, or reestablish, access to the user account. Accordingly, certain embodiments of the present invention provide an account recovery process using account recovery keys 118, via which the user can recover access to the user account, e.g., after a lockout event or loss of account credentials.

Recovery can be performed using a recovery device 106, which can be a different device from user device 104 that was used to create account recovery key set 118. For example, the user may have lost user device 104 (which may have resulted in the lockout event) and may now be using a different device. As another example, it may be desirable to require the user to go to a "controlled" location at which the user can be observed by an individual trusted by the provider of server system 102 while presenting biometric identifiers during the recovery process. For instance, if server system 102 is affiliated with a retail operation, the user may be required to go to a retail outlet to perform account recovery in the presence of a person employed at the retail outlet. In some embodiments, recovery device 106 can be the same device that was used for enrollment in the recovery service.

Figure 4:
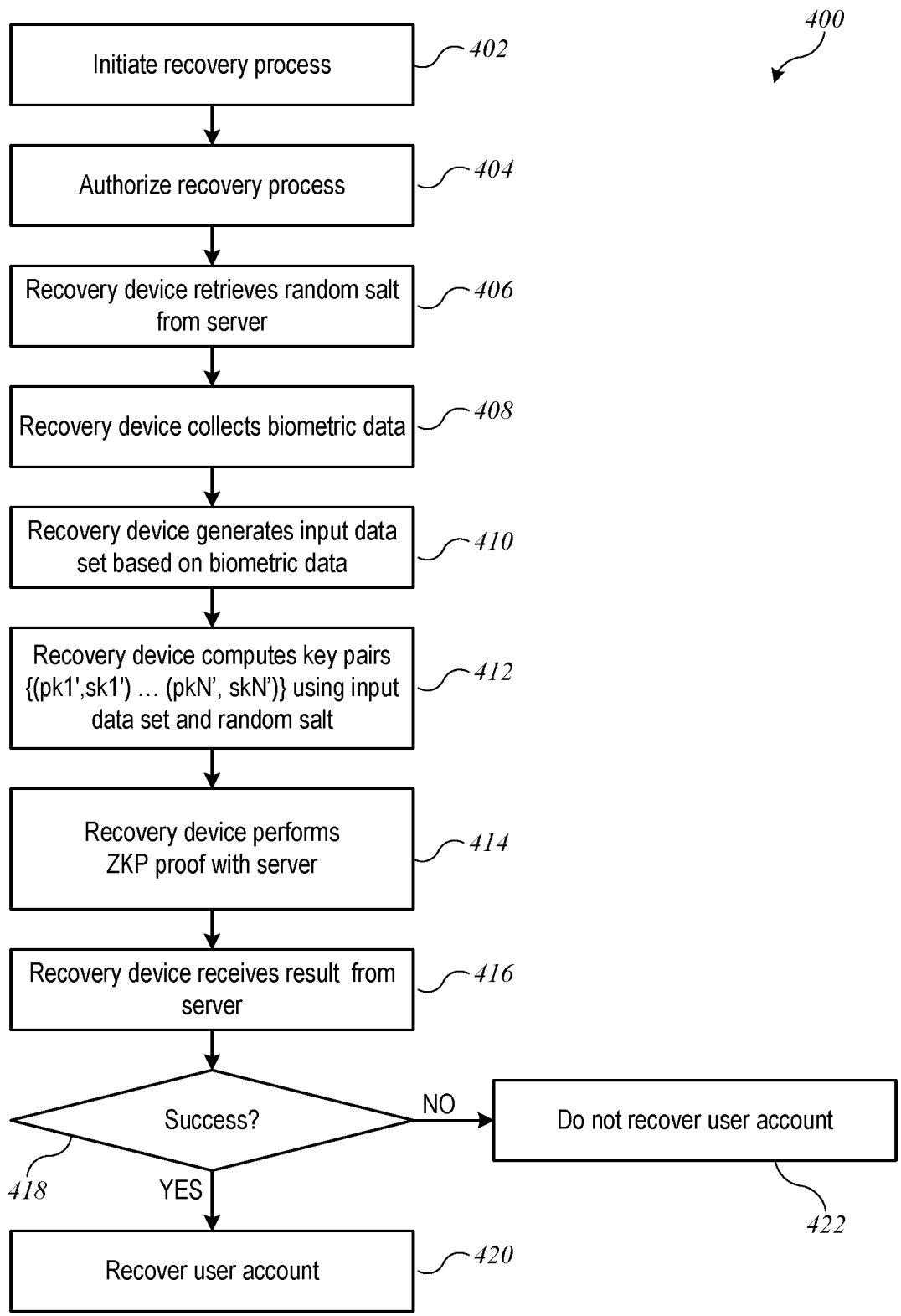
FIG. 4 shows a flow diagram of an account recovery process according to an embodiment of the present invention.

FIG. 4 shows a flow diagram of an account recovery process 400 according to an embodiment of the present invention. Process 400 can be implemented, e.g., on recovery device 106 interacting with recovery module 122 of server system 102. Through execution of recovery process 400, the user can establish her identity as the authorized user of an account for which recovery key pair set 118 was previously generated (e.g., by executing process 200 described above).

Process 400 can begin at block 402, when the user indicates to recovery device 106 that a recovery process should be initiated. Recovery device 106 can be, for instance, the same device as user device 104 (but executing a recovery process rather than an enrollment process), a replacement for user device 104, or a device provided to the user for purposes of executing a recovery process by an individual trusted by the provider of server system 102. In some embodiments, recovery device 106 can be in a controlled location (e.g., retail outlet), and the recovery process can be initiated on the instruction of a trusted individual (e.g., retail outlet employee). In some embodiments, a controlled environment is not required, and recovery device 106 can be operated at any location.

At block 404, recovery device 106 can perform an authorization operation with server 102 to authorize the recovery process. For example, recovery device 106 can provide account credentials 114 for the account to be recovered; providing the account credentials can be a necessary but not sufficient condition for recovering an account. Alternatively, since the user may have lost the account credentials, recovery device 106 can provide any information usable to identify the user account record 112 for which recovery is being attempted (e.g., the name of the user, address of the user, phone number of the user, etc.). In some embodiments, a second authentication factor may be used to confirm the recovery operation in addition to or instead of the account credentials. (This can be useful, for instance, where the user has lost or forgotten the account password, or where an unauthorized party has maliciously changed the account password to keep the user out.) For instance, server 102 can send a message to the user's device or to the user's email account (as determined from account record 112) with a confirmation code that is then entered into recovery device 106 to allow the operation to proceed. (This may not be an option, e.g., if the user has lost the device or has been locked out of the email account.) In some embodiments, in addition to or instead of evidence of user authorization, the authorization operation at block 404 can require an indication of approval from a trusted individual (e.g., a retail store employee), who can be prompted to enter an approval code or the like to verify that the recovery operation is authorized. In some instances, the trusted individual can be expected (e.g., as matter of policy) to confirm the user's identity through some other form of identification prior to indicating approval; for instance, the user may need to present a driver's license or other identification card to the trusted individual, who can confirm that the name on the identification card matches the name associated with the account being recovered. It should be understood that in some embodiments, authorization can fail at block 404, in which case process 400 can end without recovering the user's account.

At block 406, recovery device 106 can retrieve random salt 116 from server system 102. This can be the random salt that was stored at block 216 of process 200. It should be noted that providing random salt 116 to recovery device 106 has negligible (or no) associated risk if it turns out that the person attempting recovery is not the authorized user, as the salt by itself cannot be used to recover the account or to access any information stored therein.

At block 408, recovery device 106 can collect biometric data from the user. For example, recovery device 106 can perform process 300 to collect data using the same sequence of biometric identifiers that was used to generate recovery key set 118 during process 200. In instances where the user determined the sequence of biometric identifiers during enrollment, the success of recovery process 400 may depend on the user's ability to remember the sequence. Accordingly, the sequence can provide an additional level of security, as any impostor would need to not only imitate the user's biometric identifiers during recovery but also present those identifiers in the same sequence the user used during enrollment.

At block 410, recovery device 106 can generate an input data set based on the biometric data collected at block 408, and at block 412, recovery device 106 can compute a set of N "new" key pairs $\{(pk1', sk1'), \ldots (pkN', skN')\}$ using the input data set generated at block 410 and the random salt retrieved at block 406. The same algorithms used at blocks 210 and 212 of process 200 can be used at blocks 410 and 412 of process 400, so that if exactly the same biometric data is collected by the sensors in both instances, new key pairs $\{(pk1', sk1'), \ldots (pkN', skN')\}$ will exactly match the "enrollment" set of key pairs $\{(pk1, sk1), \ldots (pkN, skN)\}$ generated by process 200, the public keys of which are stored by server system 102 as recovery keys 118.

As a practical matter, it may be unlikely that the biometric data collected during enrollment process 200 and the biometric data collected during recovery process 400 will be exactly the same. For example, collection may be performed using physically different devices with different sensors, and some level of device-to-device variation can be expected. In some embodiments, calibration processes may compensate for at least some device-to-device variation. In addition, it is expected that enrollment and recovery can occur in different places at different times. The user's body may have changed somewhat in the interim, and differences in ambient light or other factors may affect the biometric data. To some extent, this can be addressed by using measurements that are relatively insensitive to time-and-place changes. However, it is assumed that, while obtaining data that is very similar is possible, obtaining exactly identical data is not to be expected. Consequently, it is assumed that while new key pairs {(pk1', sk1'), ... (pkN', skN')} might not exactly match the enrollment set of key pairs {(pk1, sk1), ... (pkN, skN)}, at least some fraction K/N can be expected to match if the person attempting recovery is the same person who previously completed enrollment.

Accordingly, the determination whether to recover the user's account access can be based on recovery device 106 proving, to the satisfaction of server system 102, that it is in possession of the user's biometric data. More specifically, at block 414, recovery device 106 can perform a ZKP proof with server system 102. In some embodiments, the proof can be based on recovery device 106 demonstrating its possession of at least K of N "correct" key pairs (i.e., key pairs corresponding to stored public keys {pk1, ... pkN}), where K is chosen to make it sufficiently unlikely that recovery device 106 could possess K or more correct key pairs without also possessing the user's biometric data. More generally, the proof can be based on recovery device 106 demonstrating its possession of a set of key pairs that is "close enough" to stored public keys {pk1, ... pkN}), where "close enough" is defined using a criterion that makes it unlikely that recovery device 106 could possess K or more correct key pairs without also possessing the user's biometric data. For example, "close enough" can be defined based on how many and/or which ones of the stored public keys recovery device 106 has been able to reproduce. To find out how many and which ones of the stored public keys recovery device 106 has been able to reproduce, server 102 can issue a set of challenges to recovery device 106, where each challenge can include a random string to be digitally signed using a specified one of the private keys (or to be signed using a specified sequence of different private keys). In some embodiments, the set of challenges can be structured such that each of the N private keys is used to sign at least one challenge; for instance, there can be N challenges, each to be signed with a different private key. Recovery device 106 can use its key pairs {(pk1', sk1'), ... (pkN', skN')} to respond to the set of challenges. Server 102 can use its stored public keys {pk1, ... pkN} to evaluate whether each response is correct or incorrect. Based on the responses, server 102 can reach a conclusion as to how many (and which ones) of the correct public keys are possessed by recovery device 106. Thus, server 102 can determine how many (and which ones) of the N public keys have been successfully recreated without acquiring any knowledge as to the correct private keys, as to what private keys recovery device 106 has, or as to the underlying secret data (including the user's biometric data). Based on this information, server 102 can make a further determination as to whether recovery device 106 has proved that it is in possession of the underlying secret data (including the user's biometric data). In this context, the standard of proof can be satisfying a confidence threshold set by server 102 that correct responses are due to the prover's knowledge of the user's biometric data and not just due to chance. Setting of a confidence threshold is described below.

Based on the responses, server 102 can determine whether the ZKP proof results in success (e.g., proof that recovery device 106 has at least K of N key pairs; additional examples of how server 102 can make the determination are described below). At block 416, recovery device 106 can receive the result of the ZKP proof from server system 102. If, at block 418, the result is success, then the user's account can be recovered at block 420. For example, recovery device 106 can prompt the user to establish a new password (and/or other account credential(s) 114) with server 102 that will allow the user to resume accessing the account through the normal login procedure. If, at block 418, the result is failure, then at block 422, the user account is not recovered. In some embodiments, the user can be allowed to try recovery process 400 again. Server system 102 can place an upper limit on the number of recovery attempts.

In any case, recovery device 106 can destroy the biometric data at any point after generating the key pairs and can destroy the key pairs once the ZKP proof has been completed (regardless of outcome). It should be noted that, similarly to the enrollment process, the biometric data can be collected and used to generate key pairs locally on recovery device 106, and biometric data need not be communicated to or shared with any other device. Further, since the same key-pair generation algorithm is used for both enrollment and recovery, biometric data is again not recoverable from the key pairs generated in the recovery process.

Figure 5:
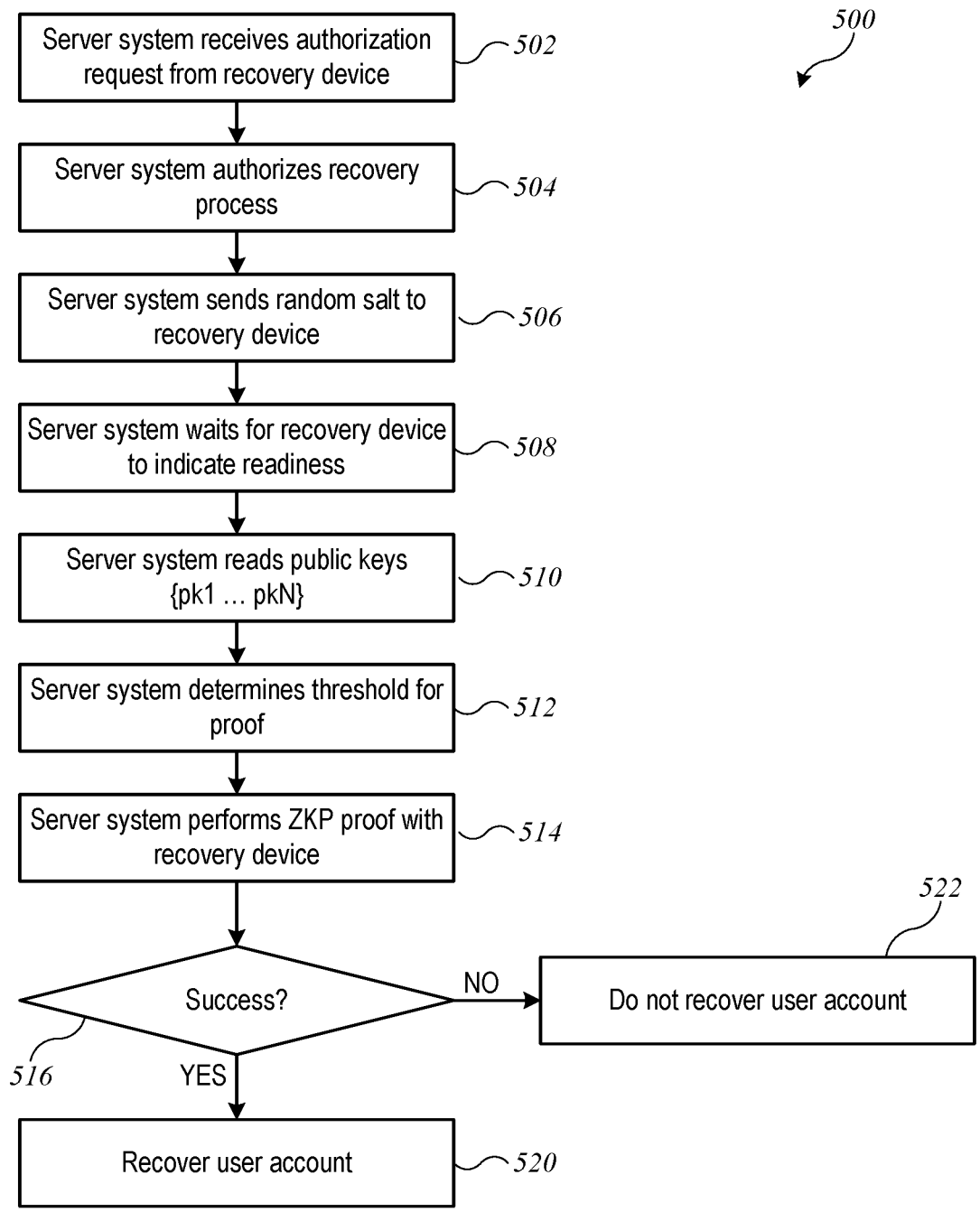
FIG. 5 shows a flow diagram of an account recovery process that can be implemented in a server system according to an embodiment of the present invention.

FIG. 5 shows a flow diagram of an account recovery process 500 that can be implemented in server system 102 (e.g., in recovery module 122) according to an embodiment of the present invention. Process 500 can be performed, e.g., while recovery device 106 is performing process 400.

Process 500 can begin at block 502, when server system 102 receives an authorization request from recovery device 106 (e.g., during execution of block 404 of process 400). At block 504, server system 102 can authorize the recovery process to proceed. As described above, server system 102 can perform various interactions to obtain authorization from the user and/or a trusted individual. This can include any or all of: verifying the user's account credentials (e.g., username and optionally password); sending a confirmation request (e.g., email or text message) to the user based on the user's stored account information and receiving a confirmation response via recovery device 106; receiving an approval code from a trusted individual; or other operations. In some embodiments, server system 102 can determine the requirements for successful authorization at block 504 depending on the specific reason for performing recovery. For instance, if the user lost a device, then sending a confirmation request message to the user's lost device would not be chosen; if the user is locked out of an email account, then sending an email message to that account would not be chosen. As another example, if recovery device 106 is in a controlled location, all that may be needed is the user's name or email address and the approval code from the trusted individual (who can be trusted to verify the user's identity prior to initiating recovery). It should be understood that if authorization fails at block 504, process 500 can end, and server system 102 can so inform recovery device 106, which can result in process 400 ending at block 404.

At block 506, assuming recovery is authorized, server system 102 can retrieve stored random salt 116 from the user's account record and send random salt 116 to recovery device 106.

At block 508, recovery process 500 can wait for recovery device 106 to indicate that it is ready to proceed. For example, it may take some time for recovery device 106 to collect the biometric data and generate key pairs. During this time, server 102 can keep a connection to recovery device 106, and recovery process 500 can be aborted if the connection is terminated prior to completion of process 500. Recovery device 106 can signal its readiness, e.g., after completing key-pair computation at block 412 of process 400.

At block 510, recovery process 500 can read stored public key set 118 from user account record 112. At block 512, recovery process 500 can determine a threshold for proof that recovery device 106 will be required to meet in order to prove its possession of the user's biometric data using a ZKP protocol. The particular threshold depends on the protocol. In the example described above, where the proof is based on recovery device 106 demonstrating knowledge of key pairs generated from the biometric data, a scoring formula based on how many and/or which of the N key pairs recovery device 106 can demonstrate possession of can be defined, and the threshold can be established as a minimum score. Various scoring formulas can be used. For example, the score can simply be the number of keys matched, and sufficient knowledge can be defined as possession of at least a threshold number K of the N key pairs.

Other scoring formulas can be defined, rather than simply counting keys matched. For example, the definition of a threshold can be based on knowledge about the algorithm(s) used to generate the N key pairs, such as which type(s) of biometric data contribute to each key pair. It may be the case that not all key pairs are equally difficult to reproduce, and a threshold of proof can be based on a scoring formula that takes into account differences in difficultly of reproducing different key pairs.

For example, as noted above, key pairs can be generated using various combinations of highly-reproducible data and less-reproducible data. Consequently, certain ones of the N key pairs may be more reliably reproducible than others. Server system 102 can treat different key pairs as having different significance, depending on how strongly it is expected that the user presenting the same biometric identifiers should result in reproducing a particular key pair. For instance, server system 102 can divide the key pairs into a "more-reproducible" subset and a "less-reproducible" subset and can apply a different minimum threshold to each. For instance if the more-reproducible subset includes N1 key pairs and the less-reproducible subset includes N2 key pairs, server system 102 can require that recovery device show possession of at least K1 of the more-reproducible key pairs and K2 of the less-reproducible key pairs, where (K1/N1) >(K2/N2), i.e., more "misses" can be allowed in the less-reproducible subset. This can be extended to any number of subsets.

As another example, each key pair can be assigned a corresponding weight, based on reproducibility of that key pair, and the scoring formula can be based on the sum of weights of the matched keys. Nonlinear scoring algorithms can also be used. As another example, the set of key pairs can be modeled as a vector in a high-dimensional space, and a distance metric or the like can be defined based on matching or failing to match a particular key pair. In some instances, there may be a subset of the key pairs that is expected to be 100% reproducible if the user presents the same biometric identifier(s), and that subset can be used as a "veto," in the sense that if all key pairs in the "100%-reproducible" subset are not matched, then the proof cannot succeed, regardless of anything else.

Given a particular scoring formula, a threshold score for proof can be selected by server system 102. The selection of a threshold score can be based on various considerations. For instance, the risk of false positives (i.e., where someone who is not the user succeeds in fooling the ZKP proof) decreases with increasing the threshold score while the risk of false negatives (i.e., where the actual user fails the ZKP proof) increases with increasing threshold score. An optimum value can balance the risk of false positives against the risk of false negatives. In some embodiments, the selection of threshold score can be based in part on a risk profile for the user. For example, the threshold score can be raised or lowered based on a history of user behavior recorded by server system 102, history of past attempts to hack the user's account (whether successful or not), and so on. In some embodiments, the selection of the threshold score can be based in part on the particular recovery device 106 being used; for instance, the threshold score can be lower if recovery device 106 is in a controlled environment and a trusted individual has indicated confirmation of the user's identity. Other considerations can include the reason for recovery. For instance, a forgotten password may result in a lower threshold score than a stolen device or a password that has been compromised.

At block 514, server system 102 can perform a ZKP proof with recovery device 106 to determine whether recovery device 106 achieves the threshold for proof established at block 512. The ZKP proof can be performed, e.g., using a set of challenges as described above to determine how many and which ones of the N correct key pairs are possessed by recovery device 106, determining a score using the applicable scoring formula, and determining whether the score reaches the threshold for proof.

At block 516, server system 102 can determine the outcome of the ZKP proof, for instance, by determining whether recovery device 106 has succeeded in demonstrating possession of at least K of the N private keys corresponding to recovery public keys 118. If, at block 516, server system 102 determines that recovery device 106 succeeded, then the user's account can be recovered at block 520. For example, server system 102 can send a request to recovery device 106 to provide a new password (and/or other account credentials); after receiving and storing new account credentials 114, server system 102 can remove any lockout protections that were preventing credentials 114 from being used, allowing the user to resume accessing the account through the normal login procedure. If, at block 516, the result is failure, then at block 522, the user account is not recovered. Server system 102 can notify recovery device 106 of the failure. In some embodiments, server system 102 can keep track of the number of unsuccessful recovery attempts and can use this number, e.g., to adjust the threshold K for allowing recovery or for other operations (e.g., permanently locking out the account or destroying some or all information stored in the account to protect user secrets).

It will be appreciated that the processes described above are illustrative and that variations and modifications are possible. Steps described as sequential may be executed in parallel, order of steps may be varied, and steps may be modified, combined, added or omitted.

The particular biometric identifier and/or combination of identifiers, and the amount and type of biometric information extracted can all be modified as desired. Those skilled in the art with access to the present disclosure will appreciate that protection against false positives can be increased by selecting biometric information that provides a large pool of entropy, such that accidental matching between the key pairs generated during the recovery process and the key pairs generated at enrollment time has low probability. This may weigh in favor of collecting more biometric information, e.g., by using multiple identifiers or an identifier with a more rich feature set (such as a face rather than a fingerprint). Further, multiple biometric identifiers of the same type can be used, such as a sequence of fingerprints instead of just one. And if the user selects the sequence, entropy is further increased in that, given the same fingers, the sequence "right thumb, left thumb, left pinky" can produce completely different key pairs from the sequence "left thumb, right thumb, left pinky." Thus, allowing the user to select a sequence of biometric identifiers can increase the difficulty of an impostor successfully recovering the user's account.

Further, other types of biometric identifiers can be used in addition to or instead of fingerprints, and multiple types of biometric identifiers can be combined. For example, biometrics can be based on analysis of facial features, ear features, or other anatomical structures. Another type of biometric measurement can be a voice print, where the user speaks a phrase or sentence to generate a distinctive sonic pattern. Where voice prints are used for key generation as described herein, the user may select the phrase or sentence to speak, which can further increase the entropy. A sequence of biometric identifiers can include any combination of identifiers of different types and/or multiple identifiers of the same type, and the identifiers can be presented in a fixed order or a user-selected order as desired.

Figure 6:
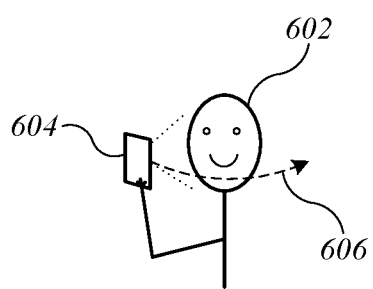
FIG. 6 shows a user collecting biometric measurements using a mobile device according to an embodiment of the present invention.

In some embodiments, the biometric measurements can be based on multiple photographic images of the user taken at a single sitting, from which data characterizing facial features of the user can be extracted. FIG. 6 shows a user 602 collecting biometric measurements using a mobile device 604 according to an embodiment of the present invention. Mobile device 604 can be a mobile phone or other personal electronic device that includes a camera capable of recording a video. As used herein, a "video" can be a series of photographic images (or "frames") captured sequentially at a rate of 10 frames/second, 30 frames/second, or other frame rates as desired. For purposes of the present description, it is assumed that the user can start and stop the recording process but does not control the timing of capturing each frame. (In some embodiments, the user may start the recording during an enrollment or recovery process, and mobile device 604 can automatically end the recording when enough frames have been captured.) As will become apparent, alternative embodiments may allow the user to operate the camera to take individual images; however, making a video recording may be easier for the user than individually taking a large number of images.

FIG. 6 shows that the user can operate mobile device 604 to record a video while the user pans mobile device 604 around his or her face, as indicated by dashed arrow 606. It is to be understood that the user can hold mobile device 604 such that the camera recording the video is oriented toward the user's face and keep the camera oriented toward the user's face for the duration of the recording. Using a "front-facing" camera (which allows the user to see an image of the camera's field of view while the camera is capturing images) may facilitate keeping the camera oriented toward the user's face.

A video captured in the manner shown in FIG. 6 can provide a potentially large number of images of the user's face, from different angles. These images can be used as sources of biometric data in the context of processes 200 and 400 described above.

Figure 7:
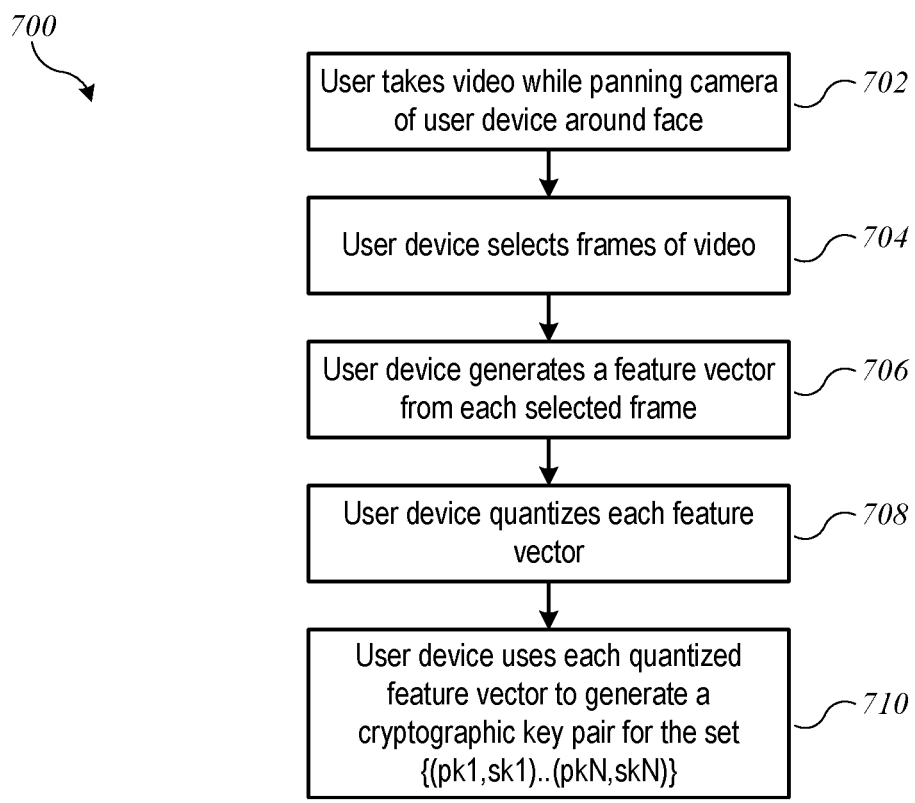
FIG. 7 is a flow diagram of a process for using a video of the user to generate cryptographic key pairs during an enrollment process according to an embodiment of the present invention.

FIG. 7 is a flow diagram of a process 700 for using a video of the user to generate cryptographic key pairs during an enrollment process according to an embodiment of the present invention. Process 700 can be implemented, e.g., at blocks 208-212 of process 200 described above, and can be performed by a user device (e.g., user device 104 or user device 604) that is executing process 200.

At block 702, user device 104 can prompt the user to capture (e.g., record) a video while panning the device around her face. In some embodiments, the prompt can specify a direction or pattern of panning motion for the user to follow; in other embodiments, the user may select the direction or pattern. In some embodiments, the prompt can also indicate a duration of the recording (e.g., 10 seconds, 30 seconds, etc.) or can tell the user when to stop recording. At block 704, user device 104 can select a set of frames from the video to be used for the enrollment process. The set of selected frames can include any number of frames (e.g., 100 frames, 500 frames, or some other number). Frames can be selected randomly or according to some selection pattern (e.g., select every 25th frame). A quasi-random selection can also be used (e.g., randomly select one frame from each second of video recorded). In some embodiments, the user does not know or control which frames are selected.

At block 706, user device 104 can generate a feature vector from each selected frame. In some embodiments, the feature vector can be based on facial features of the user, and the definition of the feature vector can be based on feature vectors used in existing (or subsequently developed) computer-based facial recognition algorithms. In computer-based facial recognition, a typical goal is to reliably match a face detected in an image to a "known" face, despite differences in lighting, pose (e.g., angle at which the face is seen in the image), hair, facial expression, facial paraphernalia (e.g., eyeglasses, facial hair, cosmetics) and other attributes of a person's appearance that may change from day to day or from one image to another. Facial recognition algorithms can be based on measurements of relatively invariant facial features (e.g., length of nose relative to height of face; spacing between the eyes, shape of eyes, etc.). Each such measurement can be used as a component in a feature vector, and the feature vector can have a large number of components (e.g., 20, 50, 100, or more). Facial recognition can be accomplished based on matching of feature vectors extracted from different images. Any algorithm(s) can be used for generating feature vectors at block 706, provided that the feature vectors are defined such that images of the same individual are expected to yield similar or identical feature vectors while images of different individuals are expected to yield dissimilar feature vectors. In some embodiments of the present invention, feature vectors can be extracted from images using algorithms that have been developed for and deployed in connection with the Photos app (made and distributed by Apple Inc.), which has a "Faces" feature operable to automatically identify photographs that include a specific individual. In some embodiments, different feature-vector generation algorithms can be applied to different selected frames; this can result in a more diverse set of feature vectors that may be harder for an impostor to mimic.

It is expected that, for a given algorithm, the feature vectors generated from different images of the same individual will be similar but not necessarily identical. To increase the likelihood of feature vectors being identical, at block 708, the user device can quantize some or all components of the feature vector, to reduce the effect of small image-to-image fluctuations. As used herein, "quantizing" a vector component can include any operation that reduces the number of possible values of the component by adjusting the value of each component to the "nearest" member of an allowed set. For instance, a particular feature-vector extraction algorithm may produce a vector vi with components (1.2, 2.36, 1.8, . . . ). The components can be quantized to integer values by a truncation algorithm, producing a vector $q_1$ with components (1, 2, 1, . . . ). As another example, the components of vi can be quantized to integer values by rounding, resulting in (1, 2, 2, . . . ). The quantization need not be to integer values, as long as the effect is to reduce the number of allowed values. For example, if the feature-vector extraction algorithm produces components with a resolution of 0.01, quantization to a tenth or to a half-integer can be used. As another example, if the feature-vector extraction algorithm produces components with integer resolution, quantization might adjust the components to an even integer (allowed values 0, 2, 4, 6, . . . ) or to a multiple of five (allowed values 0, 5, 10, 15, . . . ) or some other granularity. The particular quantization rules for a given implementation can depend on the granularity and range of allowed values of various feature vector components and design tradeoffs between making feature vectors extracted from the same user identical (rather than merely similar) while still retaining the ability of the feature vectors to distinguish different users; the particular quantization rules will depend on the feature-vector extraction algorithms used and the degree of security desired.

The quantized feature vectors produced at block 708 include personal biometric data for the user and can correspond to the input data set generated at block 210 of process 200 (FIG. 2) described above. At block 710, each quantized feature vector can be used to generate a cryptographic key pair, using techniques described above with reference to block 212 of process 200. A random salt can be included if desired. After the key pairs have been generated, enrollment process 200 can continue as described above.

Figure 8:
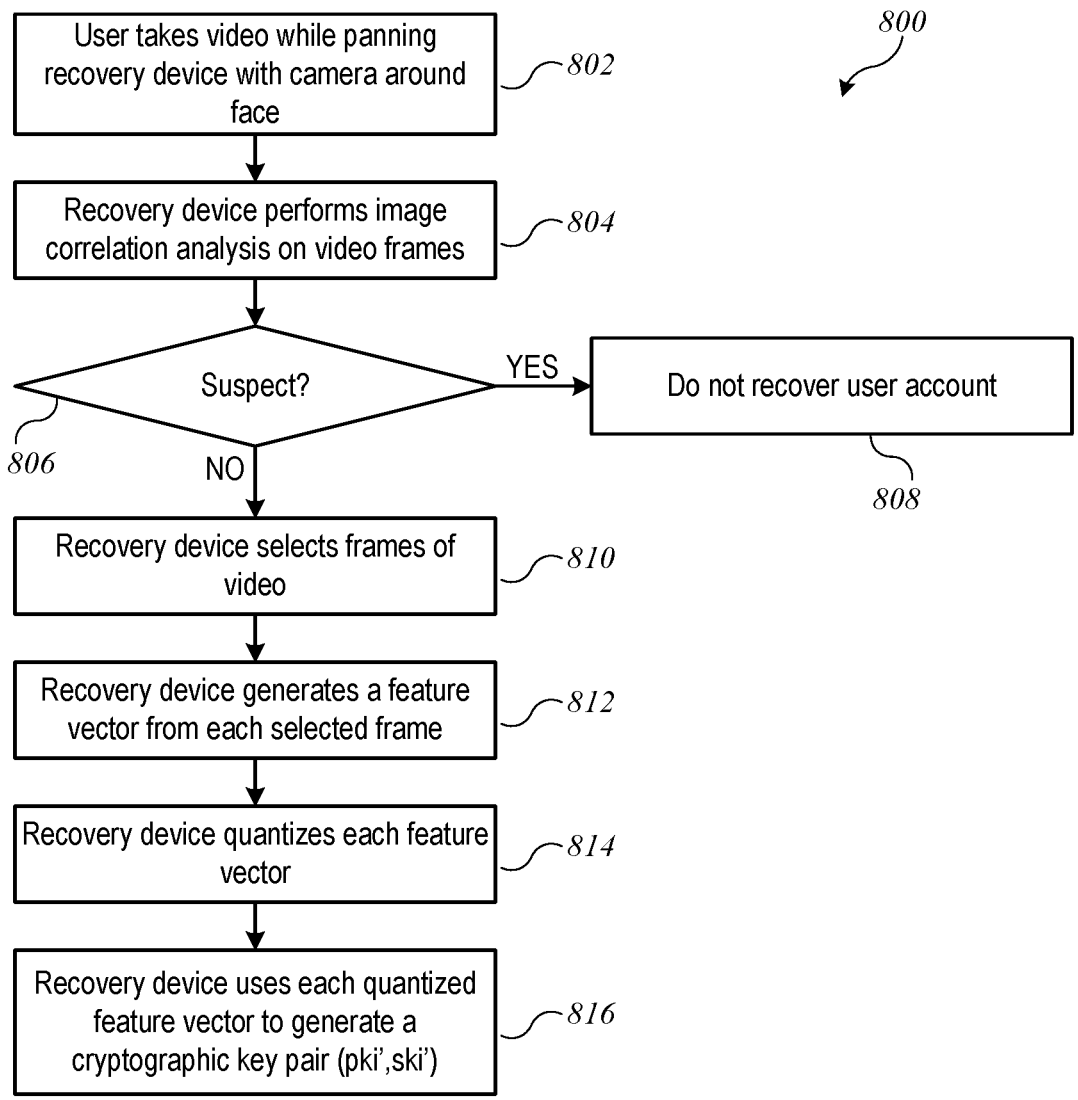
FIG. 8 shows a flow diagram of a process for using video images of a user during an account recovery process according to an embodiment of the present invention.

In the embodiment of FIG. 7, the feature vectors may be correlated with each other, since they are from images of the same user. The key pairs generated from the feature vectors, however, should not preserve any correlation. (It is noted that conventional cryptographic key generation algorithms are designed to provide key pairs that are not correlated with their inputs.) Thus, as with other examples described herein, the key pairs do not contain any information that can be used to reconstruct the user's biometric data. Since the biometric data does not leave the user's device, user privacy can be protected.

Where the enrollment process incorporates process 700, recovery of a user account can proceed using processes similar to processes 400 and 500 described above. FIG. 8 shows a flow diagram of a process 800 for using video images of a user during an account recovery process according to an embodiment of the present invention. Process 700 can be implemented, e.g., at blocks 408-412 of process 400 described above, and can be performed by a user device (e.g., recovery device 106, which can be the device used for enrollment or a different device).

At block 802, recovery device 106 can prompt the user to capture a video while panning the device around her face, similarly to block 702 of enrollment process 700. In some embodiments, the prompt can specify a direction or pattern of panning motion for the user to follow; in other embodiments, the user may select the direction or pattern. The recording operation can be the same as the recording operation used during enrollment.

At block 804, recovery device 106 can perform image correlation analysis on some or all of the video frames. The image correlation analysis can be designed to detect attempts to impersonate the authorized user based on publicly available images of the user. For instance, an impostor might collect a number of different photos of the user taken at different angles and attempt to construct a video from the photos. A more sophisticated impostor might obtain a three-dimensional model of the user's head that includes facial features and make a video of the model. The likelihood of successful impersonation can be reduced by using image correlation analysis to detect impersonation. For example, the image correlation analysis can include algorithms to verify that the images in various frames of the video are captured continuously and are of a living, three-dimensional subject. For example, continuity analysis can be based on correlations of lighting, color, and/or apparent size of objects between successive images in the video (in a continuous video, these elements may be expected to vary continuously). In one simple example, the user's clothing would be expected to remain the same throughout a video captured in the manner shown in FIG. 6. Living-subject detection can be based on algorithms that can detect blinking (e.g., a detailed analysis comparing the eye area in different images to determine when eyes are open and closed), breathing (e.g., a detailed analysis of shape of nostrils or mouth to detect movement from frame to frame). Three-dimensionality can be detected by algorithms that measure correlated changes in foreshortening, occlusion, and/or other effects associated with imaging a three-dimensional object from different angles; these algorithms can be applied to the user's face and/or to other objects in the image. Further, in embodiments where recovery device 106 also includes a motion sensor (e.g., a three-axis accelerometer as is present in many mobile phones), analysis of the motion sensor data can be used to correlate motion of the camera to shifts in the locations and/or orientations of objects in the captured frames, and the expectedness of observed shifts can be evaluated. Other correlation-based analysis algorithms can be used. It should be noted that the use of a continuously captured video, with panning of the camera, during recovery allows for image correlation analysis to detect impostors, which would be less useful for a set of discrete still images. While embodiments described herein do not use image correlation analysis during enrollment, those skilled in the art with access to the present disclosure will understand that image correlation analysis can be used during enrollment as well (which may be useful for detecting fake enrollments).

At block 806, recovery device 106 can determine whether the image correlation analysis indicates that the video is suspect. A "suspect" video can be a video for which the results of image correlation analysis suggest a likelihood that the video is an attempt at impersonation. For instance, insufficient correlations between successive images and/or anomalies in the three-dimensionality of image content may suggest that the video is not a live video capture (e.g., a composite of multiple photographs of the user from different angles is likely to have abrupt transitions where anomalies would be detectable). Absence of indications of breathing and/or blinking may suggest that the subject appearing in the video is a recreation of the user's head and not the actual user. Particular quantitative criteria for defining what is "suspect" can be established based on the particular image correlation analysis algorithms used and on the relative importance of preventing false positives (where an impostor succeeds) or false negatives (where the correct user fails to be recognized). If, at block 806, the video is determined to be suspect, then at block 808, the user account is not recovered. In some embodiments, the user can be allowed to try the recovery process again.

If, at block 806, the video is determined to be not suspect, then at block 810, recovery device 106 can select a set of frames from the video to be used for the enrollment process. As at block 704 of process 700, the set of selected frames can include any number of frames (e.g., 100 frames, 500 frames, or some other number). Frames can be selected randomly or according to some selection pattern (e.g., select every 25th frame). A quasi-random selection can also be used (e.g., randomly select one frame from each second of video recorded). In some embodiments, the user does not know or control which frames are selected. The selection algorithm used at block 806 can be but need not be the same as was used during enrollment process 700 (on the assumption that all images of the user will yield similar feature vectors); the number of frames selected can be the same.

At block 812, recovery device 106 can generate a feature vector from each selected frame, and at block 814, recovery device 106 can quantize each feature vector. The algorithms applied at blocks 812 and 814 can be identical to the algorithms applied at enrollment time (e.g., at blocks 706 and 708 of process 700), so that if the person performing recovery is in fact the user who enrolled, many or most (though not necessarily all) of the quantized feature vectors generated during recovery process 800 will match the feature vectors generated during enrollment process 700. If different feature vectors were generated using different algorithms during enrollment, the same set of algorithms can be used during recovery, provided that a correspondence is maintained such that each key pair (pki', ski') used in the ZKP proof protocol during recovery is tested against a public key (pki) that was generated during enrollment using the same algorithms.

As with other processes described herein, recovery device 106 does not share the feature vectors with other devices. Instead, at block 816, recovery device 106 can use each quantized feature vector to generate a cryptographic key pair, using the same algorithm that was used in enrollment process 700. If a random salt was included, it can be retrieved from server 102 (as described above) and used in generating the key pairs for recovery. Block 816 can correspond to key pair generation at block 412 of process 400 described above. After the key pairs have been generated, recovery process 400 can continue at block 414 as described above.

It will be appreciated that processes 700 and 800 are illustrative and that variations and modifications are possible. Video image capture and analysis as described herein can provide a large set of biometric measurements, from which a large number of key pairs (e.g., 100, 200, or more) can be generated, with a small amount of user effort. In some embodiments, key pairs generated from video image capture can be used in combination with key pairs generated from other biometric measurements (e.g., fingerprints, voice print, etc.).

It should also be noted that the processes described herein can protect the privacy of the user's biometric data. As described, in enrollment processes 200 and 700 and in recovery processes 400 and 800, the device that collects the biometric data can generate cryptographic key pairs based on the biometric data, after which the biometric data can be destroyed. Biometric data need not be received by server system 102; instead, as described, server system 102 can perform account recovery using only the public keys (which, by design of the key-generation algorithm, can be unusable to reconstruct the biometric data even approximately). Thus, in some embodiments, biometric data is never shared by the user device that collects it, and biometric data does not need to be stored on the user device for any longer than required to generate key pairs.

In some embodiments, user device 104, which collects the biometric data during the enrollment process, may locally store the biometric data. Secure storage can be used if desired, and the data need not be user-accessible. The stored biometric data can be used to monitor any systematic drift across time. For example, in embodiments where the stored biometric data includes facial feature vectors generated from images, changes in the user's weight, facial hair, hairline, adding or removing glasses, or the like, may affect the facial feature vectors. In some embodiments, the user device can identify new images of the user that may be captured at any time after enrollment (e.g., if the user takes a "selfie" by pointing the camera at himself or herself) and can compare a facial feature vector extracted from the new image to the stored feature vectors. If a significant drift is detected (enough to reduce the likelihood that the user will be able to complete the recovery process), the user device may prompt the user to re-enroll, e.g., by generating a new video using processes 200 and 700.

Figure 9:
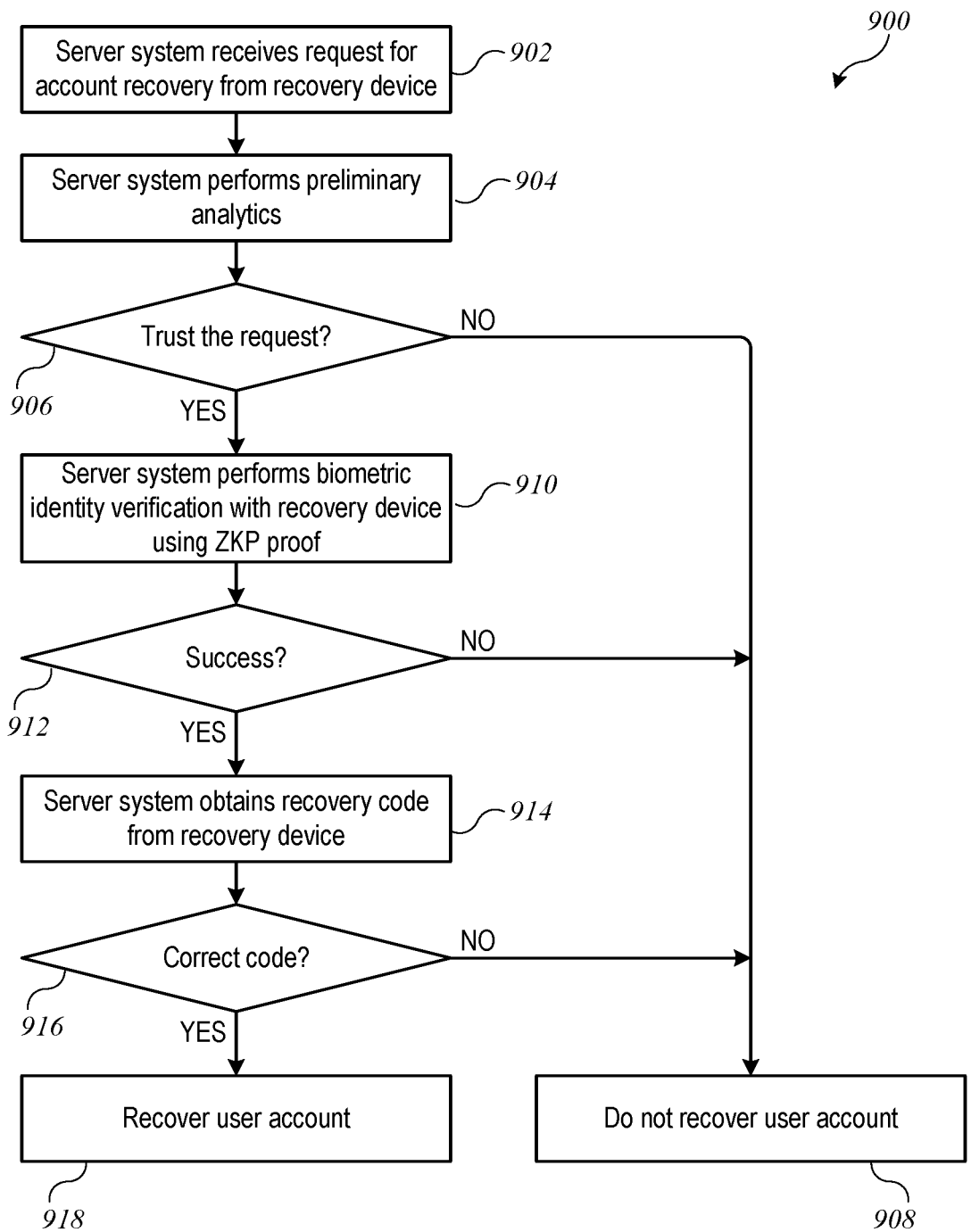
FIG. 9 shows a flow diagram of a recovery process according to an embodiment of the present invention.

In some embodiments, a recovery process as described above can be used in combination with additional identity verification measures to determine whether to allow a user to recover account data. FIG. 9 shows a flow diagram of a multi-stage account recovery process 900 according to an embodiment of the present invention. Process 900 can be implemented in server system 102 (e.g., in recovery module 122) according to an embodiment of the present invention. Process 900 can be performed, e.g., while recovery device 106 is performing process 400.

Process 900 can begin at block 902, when server system 102 receives a request for account recovery from recovery device 106 (e.g., an authorization request sent during execution of block 404 of process 400). At block 904, server system 102 can perform preliminary analytics to determine whether to trust that the request originated with the user whose account is to be recovered. Various analytics can be performed. For example, if the request is received through the internet, server system 102 may be able to determine (e.g., based on IP addresses) the approximate geographical location of recovery device 106. This can be correlated with locations that server system 102 has previously associated with the user and/or with likely sources of cyberattacks. For instance, if the request originates from a country or region where the user (or the user's device) has never been, this may raise suspicion and preclude establishing trust, especially if the country or region in question is a frequent source of cyberattacks. Conversely, if the request originates from a location where the user's device has frequently operated in the past, this makes it more likely that the operator of the recovery device is the user. As another example, if a recovery request is received at a time when the user is actively using the account, this may raise suspicion and preclude establishing trust. In some embodiments, the preliminary analytics may include requiring the user to wait for a period of time before recovery proceeds, to see if the user accesses the account, which would indicate that the user does not need to recover access.

In some embodiments, the preliminary analytics may also include requesting information from the user of recovery device 106, such as a phone number associated with the account to be recovered or the answer to a security question (e.g., "what was your first pet's name?"). For purposes of preliminary analytics, the level of security provided by such questions can be useful. Other preliminary analytics may include sending a message to the user through a separate, independent channel (e.g., SMS message or email) with a response code that the user is prompted to provide to server system 102. Any combination of different preliminary analytics can be used.

At block 906, server system 102 can determine, based on the preliminary analytics, whether to trust that the request is from the user. In some embodiments, the preliminary analytics can yield a confidence score or confidence profile (e.g., set of scores), and the determination at block 906 can be based on whether the confidence score or confidence profile satisfies established criteria (e.g., a threshold confidence score or set of threshold scores for a confidence profile). If the determination is made not to trust the request, then process 900 can end at block 908 without recovering the user account.

If block 906 results in a determination to trust the request, then at block 910, server system 102 can perform a ZKP proof protocol with the recovery device. Block 910 can be similar to blocks 506-514 of process 500 described above, with the ZKP proof protocol being used to establish that the recovery device has sufficient knowledge of a set of private keys corresponding to a set of public keys that were previously received by server system 102 during an enrollment process. The keys can be generated from biometric information about the user, including any or all of the biometrics described above. As in process 500 described above, server system 102 can define a scoring formula and a threshold score for proof on a case-by-case basis. In some embodiments, the scoring formula and/or the threshold score may be based at least in part on the results of the preliminary analytics at block 904. For instance, if trust is high (e.g., confidence score well above the threshold for trust), the threshold score for the ZKP proof can be reduced; conversely, if trust is low, the threshold score for the ZKP proof can be increased.

At block 912, server system 102 can determine whether recovery device 106 achieves the threshold for proof. If the result is failure, process 912 can end at block 908 without recovering the account.

If the result at block 912 is success, one or more additional layers of identity verification can be considered. For example, in some embodiments, a user may be able to establish a "recovery code" at the time of account enrollment. The recovery code can be a fixed-length character sequence (e.g., a six-digit code, eight-character code, etc.) that can be selected by the user and provided to server system 102 during enrollment. In some embodiments, the recovery code may instead be selected randomly by server system 102 and provided to user device 104 during enrollment. User device 104 can present the code to the user, who can save it somewhere other than on user device 104 (e.g., memorizing the code or writing it down and storing the code in a secure location). Regardless of how the recovery code is selected, server system 102 can store the recovery code in a hardware-secured storage module, such that the recovery code is not extractable from the module, but server system 102 can verify the correctness of a subsequently received recovery code using a zero-knowledge proof.

Where a recovery code has been implemented, at block 914, server system 102 can obtain the recovery code from recovery device 106. At block 916, server system 102 can determine whether the recovery code obtained from recovery device 106 is the correct recovery code for the user account, e.g., by performing a zero-knowledge proof with the hardware-secured storage module where the recovery code resides. A determination that the recovery code is incorrect can result in process 900 ending without recovering the user account at block 908. A determination that the recovery code is correct can result in recovering the account at block 918. Account recovery can be similar to block 520 of process 500 described above.

In this manner, biometric information can be incorporated into a multi-stage account recovery process. It is to be understood that process 900 is illustrative. Biometric information can be used in combination with any other type of available information, and biometric and other tests can be performed in any order. The combination of tests can help to reduce vulnerabilities in the system. For example, in some embodiments where account data is protected by a recovery code, server system 102 may limit the number of failed attempts to provide the recovery code (e.g., to a maximum of 10, 20, or 50 failed attempts); exceeding the maximum number of failed attempts may result in irreversible destruction of user data. Unless other protections are in place, it may be possible for a malicious entity to hold user data "hostage," for instance by threatening to take enough incorrect guesses to destroy the data of one or more users unless a ransom is paid. Requiring additional identity verifications prior to allowing a recovery device to provide a recovery code may provide protection against this sort of attack, as well as an increased level of confidence that the user making the recovery request is the owner of the account to be recovered.

In the examples described above, process 400 is described as being performed in situations where the user is unable to access the account through a normal login procedure and is attempting to recover such access. However, use of the techniques described herein is not limited to recovery situations; processes 400 and 500 (or similar processes) can be used in any context where user identity verification is desirable for any reason, and the result of successfully completing the ZKP proof in processes 400 and 500 can be something other than recovering the user's account access.

Figure 10:
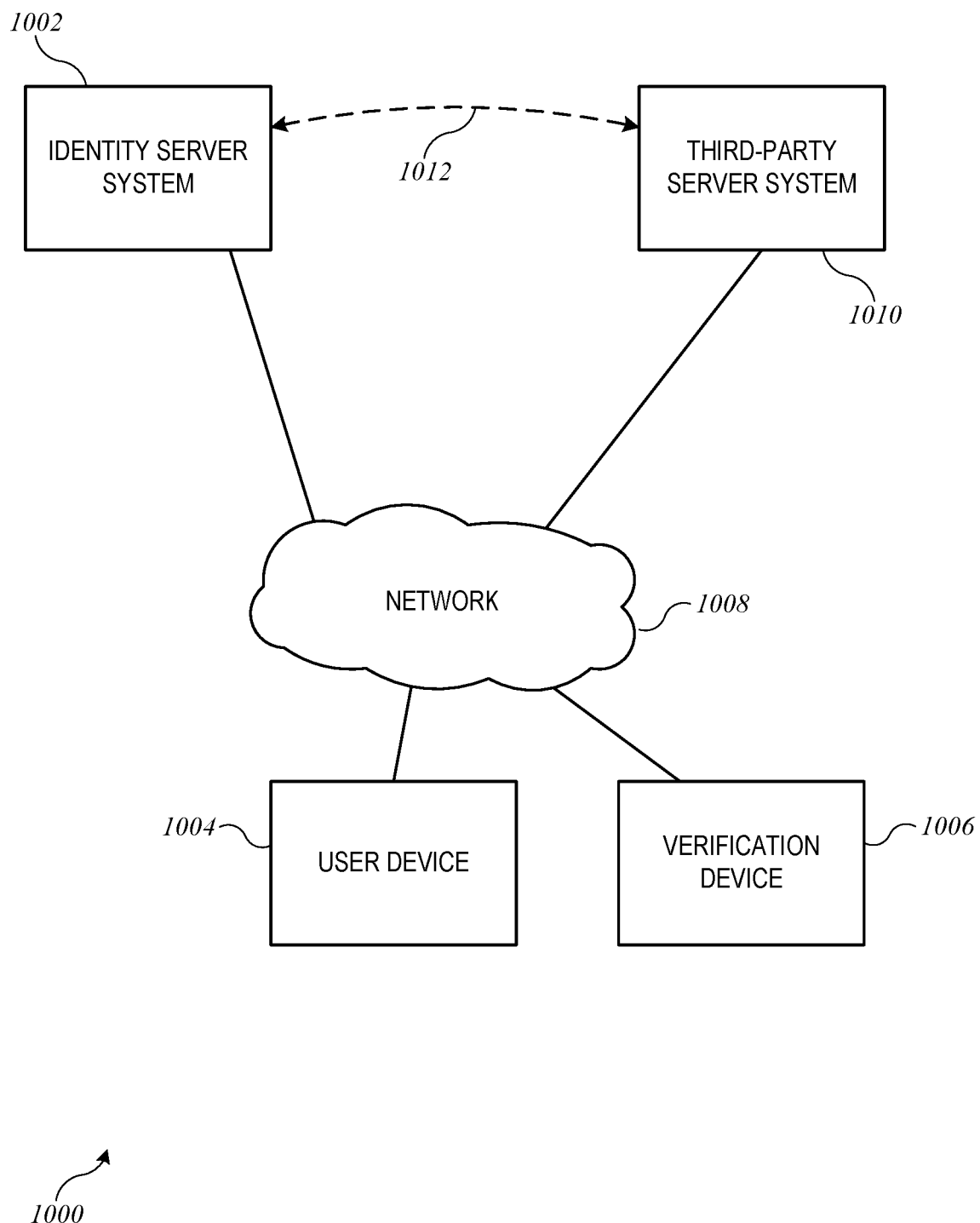
FIG. 10 shows a system according to an embodiment of the present invention.

For example, in some embodiments, server system 102 can provide an identity verification service to other server systems, including server systems operated by otherwise unrelated third parties. FIG. 10 shows a system 1000 according to an embodiment of the present invention. System 1000 can include an identity server system 1002, a user device 1004, a verification device 1006, and a third-party server 1010 communicating via a wide-area network 1008 (e.g., the Internet).

Identity server system 1002 can be similar or identical to server system 102 described above; user device 1004 can be similar or identical to user device 104 described above; and verification device 1006 can be similar or identical to recovery device 106 described above. For instance, user device 1004 can be operated to enroll the user in an identity verification service offered by identity server system 1002. The enrollment process that can be similar or identical to process 200 of FIG. 2. Verification device 1006 (which can be user device 1004 or a different device, depending on the particular implementation) can be operated to perform an identity verification process for the user with identity server system 1002. The identity verification process can be similar or identical to processes 400 and 500 described above, with the difference being that in the context of an identity verification service, success can result in identity server system 1002 generating a "user identity certification" for the user. Specific examples are described below.

Third-party server system 1010 can be any server system that has established a trust relationship (as indicated by dashed line 1012) with identity server system 1002. It is to be understood that there can be multiple different third-party server systems 1010 provided and operated by various third parties that need not have any particular connection with the provider or operator of identity server system 1002. A trust relationship between third-party server system 1010 and identity server system 1002 can be established using conventional (or other) techniques for establishing trust between computer systems, such as exchanging digital certificates signed by a trusted authority that can be used to authenticate subsequent communications between the systems, establishing a virtual private network (VPN) between the systems, or any other techniques that allow either server system to confirm (to the satisfaction of that system's operator) that a communication purportedly from the other system really did originate there and was not altered in transit. The particular mechanism for establishing and maintaining a trust relationship can be negotiated between the respective providers of identity server system 1002 and third party server system 1010.

In some embodiments, identity server system 1002 can provide an identity verification service to third-party server system 1010. For example, identity server system 1002 can, at the request of third-party server system 1010 (or user device 1004, depending on implementation) perform an identity verification process to verify a user's identity, then transmit the resulting user identity certificate to third-party server 1010 in a manner such that third-party server 1010 can verify that the user identity certificate was generated for the user by trusted identity server system 1002. Third-party server 1010 can accept the user identity certification as verification of the user's identity, e.g., for purposes of transactions involving third-party server system 1010.

In one example scenario, third-party server system 1010 can belong to a bank that offers online access to banking services via an application program (or "app") that can be executed on a user's mobile device. The bank may want to verify that a user attempting to access information about a given bank account is in fact the account holder, e.g., if the user is using the app for the first time on a new device. Accordingly, when third-party server system 1010 receives a request for access via the app and wants to verify the identity of the requester, third-party server system 1010 can invoke an identity-verification operation of identity server system 1002 and can rely on the result of this operation. In some embodiments, third-party server 1010 can first communicate with the requester (e.g., through the app) to confirm that the requester is enrolled with identity server system 1002; if not, third-party server system 1010 can proceed with an alternative identity-verification protocol or deny access. For purposes of the present description, the case where the requester is enrolled with identity server system 1002 is of interest.

Figure 11:
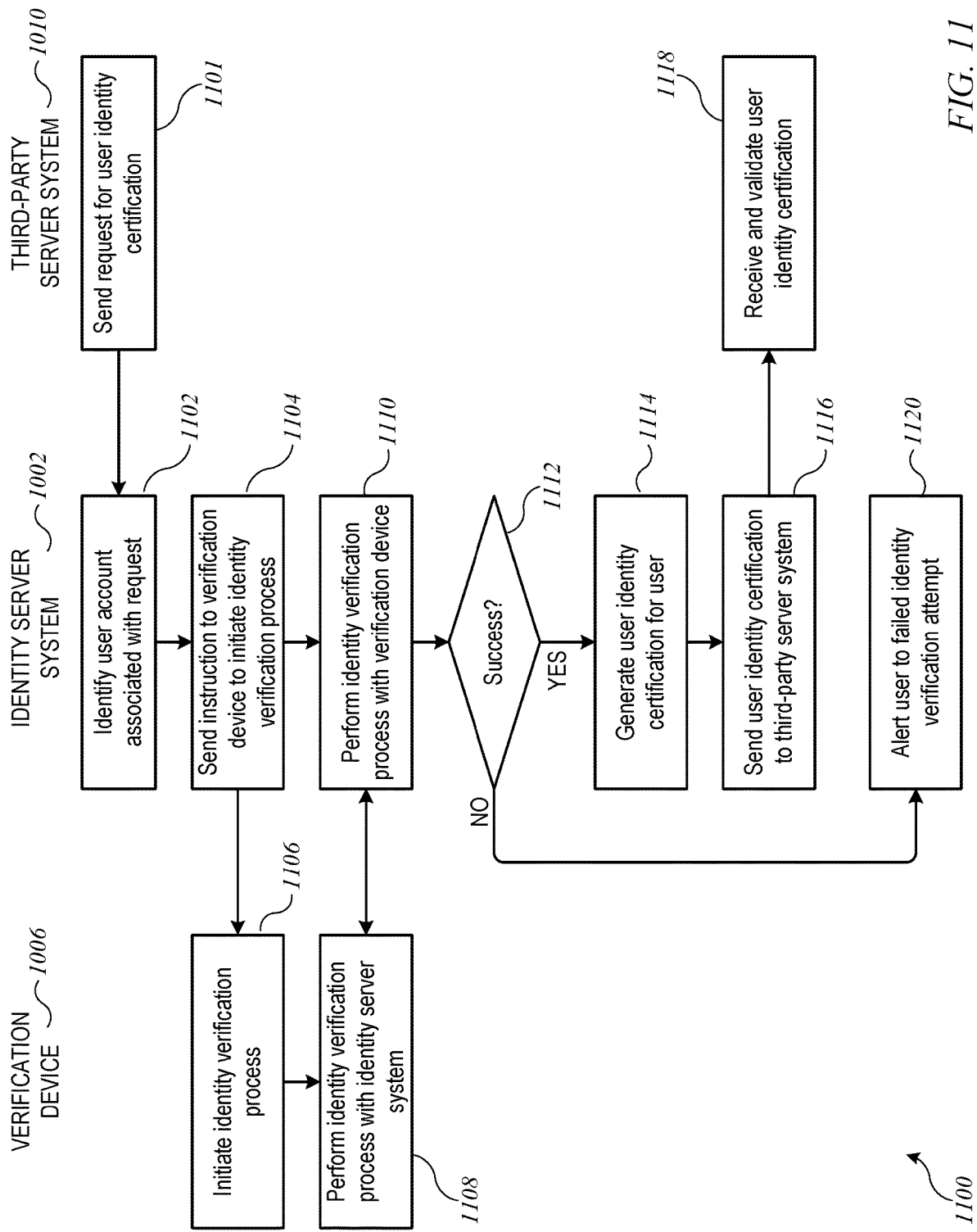
FIG. 11 shows a simplified flow diagram of a process for providing identity verification as a service according to an embodiment of the present invention.

FIG. 11 shows a simplified flow diagram of a process 1100 for providing identity verification as a service according to an embodiment of the present invention. It is assumed that a user operating user device 1004 has already established an account with identity server system 1002 and has enrolled in an identity verification service offered by identity server system 1002. It is also assumed that enrolling in the identity verification service includes executing process 200 or a similar process to generate a set of recovery (or in this case verification) key pairs {(pk1, sk1), . . . (pkN, skN)}, the public keys {pk1, . . . pkN} of which have been stored by identity server system 1002 as part of the user account record, as described above. Server 1002 can subsequently use these keys to verify the user's identity.

Process 1100 can begin, e.g., at block 1101 with a request from third-party server system 1010 to identity server system 1002 requesting a user identity certification. The request can specify the user for whom the certification is being requested (e.g., by reference to the user's name, email address, account identifier with identity server system 1002, or other information that third-party server system 1010 has about the user in question). The request can also include request-identifying information (e.g., a message ID and/or identifier of the third-party server system making the request).

At block 1102, identity server system 1002 can receive the request and can identify a user account associated with the request. For instance, identity server system 1002 can extract user-specific information from the request (e.g., the user's name, email address, account identifier with identity server system 1002, or other information provided by third-party server system 1010) and can attempt to match the information to user information stored in a user account record (e.g., user account record 112 as described above). If a user account cannot be identified, identity server system 1002 can so notify third-party server system 1010, and process 1100 can end with the user's identity not being verified. (At that point, third party server system 1010 can take other steps as desired.)

Assuming a user account is identified, at block 1104, identity server system 1002 can send an instruction to a verification device 1006 to initiate an identity verification process. In some instances, verification device 1006 can be a personal device of the user and can be, e.g., the same device used to enroll in the identity verification service. In some embodiments, the user may be instructed to go to a controlled location (e.g., as described above) to perform the identity verification in the presence of a trusted individual. The particular implementation can depend on the degree of security desired and the particular biometric data to be collected. Depending on implementation, the request may be sent to the user (e.g., via email or text message) with instructions on where or how to obtain physical access to verification device 1006.

At block 1106, verification device 1006 can initiate an identity verification process with identity server system 1002. Depending on implementation, various operations can be performed to initiate the process. For example, verification device 1006 can prompt the user to perform a normal login process with identity server system 1002. In cases where the verification is being performed in a controlled location, verification device 1006 can prompt for and receive an access code from a trusted individual as described above. In some embodiments, operations at block 1106 can be similar to blocks 402 and 404 of process 400 described above.

At blocks 1108 and 1110, verification device 1006 can perform an identity verification process with identity server system 1002. The identity verification process can be similar or identical to processes 400 and 500 described above, except that the result in this case is not recovery or non-recovery of access to the user account. Instead, at block 1112, if identity server system 1002 determines that verification device 1006 successfully completed the ZKP proof, then at block 1114, identity server system 1012 can generate a user identity certification for the user. The user identity certification can include user-identifying information (e.g., the user's name, email address, or any other user-identifying information that was included in the request from third-party server system 1010), any or all request-identifying information that was included in the request from third-party server system 1010), a timestamp indicating when the certification was generated, a code or other information indicating that the user's identity was verified, and other information as desired. The user identity certification can be digitally signed by identity server system 1002; other techniques can also be used to increase the difficulty of forging a user identity certification. It should be noted that the user identity certification need not contain any of the biometric data or the key pairs generated from the biometric data.

At block 1116, identity server system 1002 can send the user identity certification to third-party server system 1010. In some embodiments, the user identity certification can be sent over a secure channel (e.g., VPN or the like). In some embodiments, a public network can be used, and the user identity certification can be encrypted or otherwise protected against reading and/or modification by anyone other than third-party server system 1010. In some embodiments, identity server system 1002 can also notify the user that the user's identity has been certified to third-party server system 1010. (This may allow the user to detect fraud, in the unlikely event of a false positive.)

At block 1118, third-party server system 1010 can receive and validate the user identity certification. Validation can include, e.g., decrypting the certification (if it was encrypted), verifying a digital signature of identity server system 1002, validating a timestamp (e.g., to make sure the certification is recent), comparing user-identification information in the certification to expected user-identification information, comparing request-identification information in the certification to expected request-identification information, and so on. Assuming the certification is validated, third-party server system 1010 can trust that the user is in fact who the user purports to be.

If, at block 1112, identity server system 1002 determines that verification device 1006 did not successfully complete the ZKP proof protocol, then at block 1120, identity server system 1002 can alert the user to the failed identity verification attempt. For example, identity server system 1002 can send a text message or email message to a device or email account associated with the user account against which the unsuccessful attempt occurred. Thus, the user may learn that someone else is attempting to use her identity. Depending on implementation, identity server system 1002 can also notify third-party server system 1010 and/or verification device 1006 of the failure.

It will be appreciated that system 1000 and process 1100 are illustrative and that variations and modifications are possible. Process described as sequential may be executed in parallel, order of steps may be varied, and steps may be modified, combined, added or omitted. For instance, the identity verification process at blocks 1108 and 1110 can allow for multiple attempts to be made (e.g., two attempts, three attempts or the like) before determining a result at block 1112.

The sequence of events by which an identity verification process is initiated can also be varied, and different initiation sequences can be used in different instances. For instance, in one alternative initiation sequence, third-party server 1010 can send a "start-verification" request to the user or to the user's device (rather than to identity server 1002), requesting that the user obtain a user identity certification from identity server system 1002. In response to this start-verification request, the user or the user's device can initiate the identity verification process with identity server system 1002 without identity server system 1002 first receiving a request from third-party server system 1010. Where this is the case, the user's device can provide the received start-verification request (or information extracted therefrom) to identity server system 1002, allowing identity server system 1002 to include request-identifying information and/or requester-identifying information that refers to third-party server system 1010 in any user identity certification that may be generated.

Similarly, in some embodiments, identity server system 1002 can provide the user identity certification to verification device 1006, and verification device 1006 can forward the user identity certification to third-party server system 1010 for validation. Assuming that the user identity certification includes appropriate authentication and protection against reading and/or modification by anyone other than third-party server system 1010, third-party server system 1010 can trust the certification regardless of whether delivery path includes verification device 1006.

In this manner, identity server system 1002 can provide identity-verification services to any number of third-party server systems 1010 operated by any number of third parties. In some embodiments, the provider of a particular third-party server system 1010 can determine a desired security level, and this can, for example, influence the selection by identity server system 1002 of the threshold or other criteria for defining sufficient knowledge or satisfactory proof of knowledge in the context of a ZKP proof as described above. Further, the provider of third-party server system 1010 may be able to specify other conditions, such as whether the user can perform validation on a user device, or on a device at a controlled location (which can be a specific location selected by the provider of third-party server system 1010). It is to be understood that different third-party service providers may be driven by different considerations and may therefore opt for different levels of stringency in the process, e.g., depending on the degree of risk involved if the user turns out not to be who she purports to be. In some embodiments, the stringency of the process may be determined entirely by the provider of identity verification server system 1002.

Identity verification services provided by identity server system 1002 can be used in any context where it is desirable for a third-party server system (or any other server system) to confirm a user identity using biometric data, without becoming privy to any biometric information about the user. In some embodiments, third-party server system 1010 can incorporate identity verification process 1100 or a similar process into a "normal" login procedure (e.g., requiring a certification each time the user connects or logs in). In addition or instead, third-party server system 1010 can incorporate identity verification process 1100 into its own account recovery procedures, such that when a user attempts to recover an account with third-party server system 1010, success or failure of the recovery attempt can depend at least in part on whether the user succeeds in generating a user identity certification from identity server system 1002. Further, identity verification process 1100 can be used in connection with providing brick-and-mortar services to an individual. For example, a user who appears in person at a bank to make a large withdrawal from an account can be required by the bank to perform identity verification process 1100 or a similar process under the supervision of bank personnel.

It should be noted that process 1100 (or similar processes) can be performed without transferring any knowledge from identity server system 1002 or verification device 1006 to third-party server system 1010, other than the outcome of the identity verification process. For instance, third-party server system 1010 does not need to receive any of the biometric data or the public or private keys (or other information) generated therefrom. Further, in some embodiments, generation of the user identity certification can be performed such that the only user-identifying information included is information that was previously provided by third-party server system 1010 in connection with the request. Thus, third-party server system 1010 can perform process 1100 without learning anything about the user other than whether the identity validation operation succeeded or failed. In some instance, this absence of knowledge can allow third-party server system 1010 to reduce the amount of personal data it stores about its users, which can help to protect user privacy.

Figure 12:
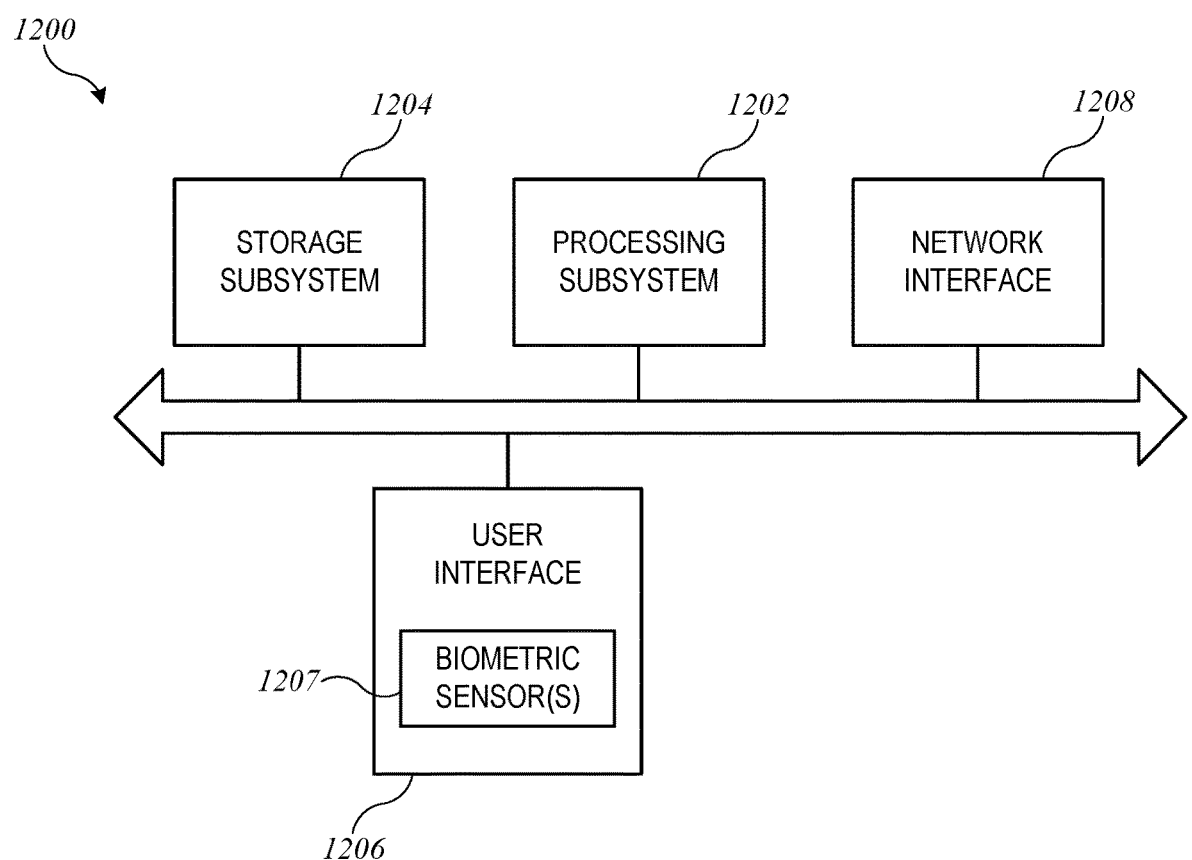
FIG. 12 is a simplified block diagram of a computer system that can be used in connection with an embodiment of the present invention.

Embodiments described herein can be implemented using computer systems that can be of generally conventional design. FIG. 12 is a simplified block diagram of a computer system 1200 that can be used in connection with an embodiment of the present invention. In some embodiments, computer system 1200 can implement any or all of the functions, behaviors, and capabilities described herein as being performed by a user device or recovery device (including user device 104 and recovery device 106 of FIG. 1), as well as other functions, behaviors, and capabilities not expressly described. In some embodiments, another physical instance of computer system 1200 can implement any or all of the functions, behaviors, and capabilities described herein as being performed by a server (including server system 102 of FIG. 1).

Computer system 1200 can include processing subsystem 1202, storage subsystem 1204, user interface 1206, and network interface 1208. Computer system 1200 can also include other components (not explicitly shown) such as a battery, power controllers, and other components operable to provide various enhanced capabilities. In some embodiments, computer system 1200 can be implemented in a consumer electronic device such as a desktop or laptop computer, tablet computer, smart phone, other mobile phone, wearable device, media device. household appliance, or the like. Computer system 1200 can also be implemented in a large-scale architecture such as a scalable server system or server farm that can include many interconnected processors, storage systems and interfaces, capable of processing and responding to high volumes of requests from client devices (including user devices and/or recovery devices).

Storage subsystem 1204 can be implemented, e.g., using disk, flash memory, or any other non-transitory storage medium, or a combination of media, and can include volatile and/or non-volatile storage media. In some embodiments, storage subsystem 1204 can store one or more application and/or operating system programs to be executed by processing subsystem 1202, including programs to implement any or all operations described herein as being performed by a user device or recovery device. For example, storage subsystem 1204 can store program code implementing key-pair generation logic 126 (or key-pair generation logic 136, which can use the same program code), program code to process biometric sensor data, and/or program code implementing challenge-response logic 138 (in the case of a recovery device). In instances where computer system 1200 implements a server, storage subsystem 1204 can be implemented using network storage technologies and/or other technologies that can manage high-volume requests to large data stores. For example, storage subsystem 1204 can store and manage user account information repository 110.

User interface 1206 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). User interface 1206 can also include one or more biometric sensors 1207, such as a fingerprint sensor to generate data representing fingerprint patterns, a camera to capture still or video images (e.g., of the user's face, ear, or other anatomical features), a microphone to capture the user's speech, and so on. In some embodiments, a user can operate input devices of user interface 1206 to invoke functionality of computer system 1200 and can view and/or hear output from computer system 1200 via output devices of user interface 1206. In instances where computer system 1200 implements a server, user interface 1206 (which can include, e.g., an operator console) can be remotely located with respect to processing subsystem 1202 and/or storage subsystem 1204.

Processing subsystem 1202 can be implemented using one or more integrated circuits, e.g., one or more single-core or multi-core microprocessors or microcontrollers, examples of which are known in the art. In operation, processing subsystem 1202 can control the operation of computer system 1200. In various embodiments, processing subsystem 1202 can execute a variety of programs in response to program code and can maintain multiple concurrently executing programs or processes. At any given time, some or all of the program code to be executed can be resident in processing subsystem 1202 and/or in storage media such as storage subsystem 1204.

Through suitable programming, processing subsystem 1202 can provide various functionality for computer system 1200. For example, where computer system 1200 implements user device 104 or recovery device 106, processing subsystem 1202 can implement various processes (or portions thereof) described above as being implemented by a user device or recovery device. Processing subsystem 1202 can also execute other programs to control other functions of computer system 1200, including other programs that may be stored in storage subsystem 1204. Where computer system 1200 implements server system 102, processing subsystem 1202 can implement operations related to account enrollment and account recovery as described above, as well as other operations that may be supported or performed by server system 102.

Network communication interface 1208 can provide voice and/or data communication capability for computer system 1200. In some embodiments, network communication interface 1208 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 1208 can provide wired network connectivity (e.g., Ethernet) in addition to or instead of a wireless interface. Network communication interface 1208 can be implemented using a combination of hardware (e.g., driver circuits, antennas, modulators/demodulators, encoders/decoders, and other analog and/or digital signal processing circuits) and software components. In some embodiments, network communication interface 1208 can support multiple communication channels concurrently, using the same transport or different transports.

It will be appreciated that computer system 1200 is illustrative and that variations and modifications are possible. User devices (and recovery devices) implemented using computer system 1200 can be portable or non-portable as desired, and any number of user devices and/or recovery devices can communicate with a particular server system. Devices and/or server systems can have functionality not described herein (e.g., a user device may provide voice communication via cellular telephone networks; control mechanisms and/or interfaces for operating an appliance such as a thermostat or door lock; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For instance, in embodiments described above, the user device and recovery device can be different devices. This can allow the user to recover account access even after the user device via which the user performed enrollment is lost, stolen, damaged, or destroyed. However, it is not required that a user use a different device, and in some embodiments, recovery can be performed using the same device that was used for account enrollment.

In some embodiments, the user can be prompted to periodically redo the enrollment process. For example, it is expected that biometric identifiers may drift over time (e.g., due to effects of aging, random accidents, and such). Periodic regeneration of biometric-based recovery keys can increase the likelihood that the recovery process will successfully reconstruct a sufficient fraction of the key pairs. Also, over time, the user may forget the sequence of biometric inputs that was originally used, and periodically regenerating the recovery keys can help the user remember. As noted above, in some embodiments, the user device on which the user performed the enrollment process can monitor for systematic drift in the user's biometric data and can prompt the user to redo the enrollment process.

An aspect of the present technology is the gathering and use of data available from specific and legitimate sources to verify an identity. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for verifying identity using biometrics, during an enrollment process for a user account maintained at a server, the method comprising:
   collecting, at a first device, a first data set representing first biometric information obtained from a user using one or more biometric sensors of the first device;
   generating, at the first device, a first set of N key pairs based on the first data set using a key-generation algorithm, wherein a number N is greater than 1 and wherein each key pair in the data first set includes a public key and a private key;
   sending, by the first device to the server, the public key of each of the N key pairs to be stored by the server in a user account information record for the user account; and
   during a verification process subsequent to the enrollment process, performing, at a second device, a zero knowledge probabilistic proof with the server using the private key of each of the N key pairs in a second set, wherein successful performance of the zero knowledge probabilistic proof establishes to the server that the second device is in possession of private keys corresponding to at least a minimum number K of N public keys stored at the server, wherein K is less than N, and wherein the minimum number K of N is a threshold number of the first set of N key pairs that defines a degree of confidence that the first device has biometric information from an authorized user.

2. The method of claim 1 wherein collecting the first data set includes:
   operating a video camera of the first device to capture a video of the user;
   selecting a set of frames from the captured video; and
   extracting a feature vector from each selected frame, wherein the feature vector includes biometric data representing facial features of the user.

3. The method of claim 1 wherein collecting the first data set includes:
   prompting, by the first device, the user to present a biometric identifier to a biometric sensor of the first device;
   operating the biometric sensor to collect biometric data from the presented biometric identifier; and
   generating the first data set based on the biometric data.

4. The method of claim 1 wherein collecting the first data set includes:
   prompting, by the first device, the user to present at least two different biometric identifiers to the one or more biometric sensors of the first device; and
   operating the one or more biometric sensors to collect biometric data from each presented identifier.

5. The method of claim 4 wherein the first data set depends on an order in which the at least two biometric identifiers are presented.

6. The method of claim 4 wherein an order in which the at least two different biometric identifiers are presented is selected by the user.

7. The method of claim 4 wherein the at least two different biometric identifiers include fingerprints of at least two different fingers of the user.

8. The method of claim 4 wherein the at least two different biometric identifiers include at least two of:
   a fingerprint of the user;
   a measurement of one or more facial features of the user;
   an ear print of the user; or
   a voice print of the user.

9. The method of claim 1 wherein generating the first set of N key pairs includes generating a random salt to be used in the key generation algorithm, the method further comprising:
   sending, by the first device to the server, the random salt to be stored by the server in the user account information record for the user account.

10. The method of claim 1 wherein the number N is at least 100.

11. The method of claim 1 further comprising, during the verification process subsequent to the enrollment process and prior to performing, at the second device, the zero knowledge probabilistic proof:
   collecting, at the second device, a second data set representing second biometric information obtained from a person purporting to be the user using one or more biometric sensors of the second device, wherein the second biometric information corresponds to the first biometric information; and
   generating, at the second device, a second set of N key pairs based on the second data set using the key-generation algorithm, wherein each key pair in the second set includes a public key and a private key.

12. The method of claim 11 wherein performing the zero-knowledge probabilistic proof includes:
receiving a set of challenges from the server, each challenge to be signed with a specified one of the private keys of the second set of N key pairs;
signing each challenge with the specified one of the private keys of the second set of N key pairs; and
sending the signed challenges to the server.

13. The method of claim 11 wherein the verification process is an account recovery process, the method further comprising:
recovering access to the user account information record in response to successful performance of the zero-knowledge probabilistic proof.

14. The method of claim 11 wherein the verification process is a user identity process that results in the server generating a user identity certification in response to successful performance of the zero-knowledge probabilistic proof and wherein the user identity certification is delivered to a third-party server system.

15. The method of claim 11 wherein the second device is a different device from the first device.

16. An electronic device for verifying identity using biometrics during an enrollment process for a user account maintained at a server system, the electronic device comprising:
a biometric sensor;
a communication interface to communicate with the server system; and
a processor coupled to the biometric sensor and the communication interface, the processor configured to:
collect, using the biometric sensor, a data set representing biometric information obtained from a person purporting to be an authorized user of the user account at the server system;
generate a set of N key pairs based on the data set using a key-generation algorithm, wherein each key pair in the set includes a public key and a private key; and
perform a zero-knowledge probabilistic proof with the server system using the private key of each of the N key pairs in the set, wherein successful performance of the zero-knowledge probabilistic proof establishes to the server system that the electronic device is in possession of private keys corresponding to at least a minimum number K of a recovery key set of N public keys stored at the server system, wherein K is less than N, and wherein the minimum number K of the recovery key set of N public keys is a threshold number of the N key pairs that defines a degree of confidence that the electronic device has biometric information from the authorized user.

17. The electronic device of claim 16 wherein the processor is further configured to:
recover access to a user account information record in response to successful performance of the zero-knowledge probabilistic proof.

18. A server system for verifying identity using biometrics during an enrollment process for a user account maintained at the server system, the server system comprising:
a data store to store user account information records for a plurality of user accounts;
a network interface to communicate with a plurality of computer devices including a user device and a verification device; and
a processing subsystem, including at least one hardware processor, coupled to the data store and the network interface, the processing subsystem configured to:
obtain from the user device a set of N recovery keys for the user account, wherein a first user device generates the set of N recovery keys using biometric data of a user to whom the user account belongs;
store the set of N recovery keys in a user account information record for the user account;
receive a verification request, the verification request identifying the user account; and
perform a zero-knowledge probabilistic proof with the verification device using the stored set of N recovery keys, wherein successful performance of the zero-knowledge probabilistic proof establishes to the processing subsystem that the verification device is in possession of private keys corresponding to at least a minimum number K of the keys in the set of N recovery keys, wherein K is less than N, and wherein the minimum number K of the keys in the set of N recovery keys is a threshold number of the set of N recovery keys that defines a degree of confidence that the user device has biometric information from an authorized user.

19. The server system of claim 18 wherein the verification request includes an account recovery request and wherein the processing subsystem is further configured to recover access to the user account information record in response to successful performance of the zero-knowledge probabilistic proof.

20. The server system of claim 18 wherein the verification request includes an identity verification request and wherein the processing subsystem is further configured to generate a user identity certification in response to successful performance of the zero-knowledge probabilistic proof.

* * * * *